US011066725B2

(12) United States Patent
Rothman et al.

(10) Patent No.: US 11,066,725 B2
(45) Date of Patent: Jul. 20, 2021

(54) CYCLONE UNDERFLOW SCAVENGERING PROCESS USING ENHANCED MINERAL SEPARATION CIRCUITS (EMSC)

(71) Applicant: CiDRA Corporate Services LLC, Wallingford, CT (US)

(72) Inventors: Paul J. Rothman, Windsor, CT (US); Adam Michael Jordens, West Hartford, CT (US); Peter A. Amelunxen, Colebay (SX)

(73) Assignee: CIDRA CORPORATE SERVICES LLC, Wallingford, CT (US)

( * ) Notice: Subject to any disclaimer, the term of this patent is extended or adjusted under 35 U.S.C. 154(b) by 0 days.

(21) Appl. No.: 16/489,966

(22) PCT Filed: Mar. 1, 2018

(86) PCT No.: PCT/US2018/020405
§ 371 (c)(1),
(2) Date: Aug. 29, 2019

(87) PCT Pub. No.: WO2018/160806
PCT Pub. Date: Sep. 7, 2018

(65) Prior Publication Data
US 2019/0390298 A1    Dec. 26, 2019

Related U.S. Application Data

(60) Provisional application No. 62/465,250, filed on Mar. 1, 2017.

(51) Int. Cl.
B02C 23/10    (2006.01)
C22B 3/24    (2006.01)
(Continued)

(52) U.S. Cl.
CPC ............... C22B 3/24 (2013.01); B03D 1/023 (2013.01); B03D 1/1406 (2013.01); B03D 1/1425 (2013.01); C22B 11/02 (2013.01)

(58) Field of Classification Search
CPC .... B03B 5/04; B03B 5/28; B03B 5/34; B03B 7/00; B03B 9/005; B03D 1/023;
(Continued)

(56) References Cited

U.S. PATENT DOCUMENTS 3,622,087 A * 11/1971 Oltmann ................... B03B 7/00
241/62
4,222,529 A    9/1980 Long
(Continued)

FOREIGN PATENT DOCUMENTS

CL    2016002682 A1    2/2017
WO    2012162591 A1    11/2012
(Continued)

Primary Examiner — Joseph C Rodriguez
(74) Attorney, Agent, or Firm — Ware, Fressola, Maguire & Barber LLP

(57) ABSTRACT

A system is provided for processing a circulating load in comminution circuit of a mineral separation process for separating mineral particles of interest from an ore, featuring: a coarse screen and an enhanced mineral separation circuit (EMSC). The coarse screen may be configured to receive a cyclone underflow having mineral particles of interest and forming part of the circulating load of the comminution circuit, and provide coarse screen feeds for further processing. The enhanced mineral separation circuit may include a collection processor configured to receive one of the coarse screen feeds, and may also include at least one collection apparatus located in the collection processor, the at least one collection apparatus having a collection surface configured with a functionalized polymer comprising a plurality of molecules having a functional group configured to attract the mineral particles of interest to the collection (Continued)

surface, and provide enhanced mineral separation circuit feeds for further processing in the system.

38 Claims, 26 Drawing Sheets

(51) Int. Cl.
*B03D 1/02* (2006.01)
*B03D 1/14* (2006.01)
*C22B 11/02* (2006.01)

(58) Field of Classification Search
CPC .. B03D 1/1406; B03D 1/1418; B03D 1/1425; B03D 2203/02; B02C 23/10; B02C 23/12; B02C 23/14; B02C 23/16; B02C 23/22; B02C 21/00; C22B 3/24; C22B 11/02

See application file for complete search history.

(56) References Cited

U.S. PATENT DOCUMENTS

| | | | | |
|---|---|---|---|---|
| 4,938,864 A * | 7/1990 | Frazier | ............ | B03B 9/005 |
| | | | | 209/11 |
| 5,022,983 A * | 6/1991 | Myers | ............ | B03B 9/005 |
| | | | | 209/166 |
| 5,338,337 A * | 8/1994 | Johnson | ............ | B03B 9/00 |
| | | | | 75/654 |
| 5,900,604 A * | 5/1999 | McNeill | ............ | B03B 9/00 |
| | | | | 209/12.1 |
| 6,210,648 B1 | 4/2001 | Gathje | | |
| 6,896,808 B1 | 5/2005 | Jay | | |
| 7,972,696 B2 * | 7/2011 | Sandmeyer | ............ | C09D 7/65 |
| | | | | 428/404 |
| 8,408,395 B2 * | 4/2013 | Domke | ............ | C22B 1/00 |
| | | | | 209/9 |
| 9,302,270 B2 * | 4/2016 | Rothman | ............ | B03C 5/02 |
| 9,731,221 B2 * | 8/2017 | Rothman | ............ | C02F 1/281 |
| 9,943,860 B2 * | 4/2018 | Rothman | ............ | B01D 39/00 |
| 2010/0200510 A1 * | 8/2010 | Domke | ............ | C22B 15/0002 |
| | | | | 210/679 |
| 2012/0289440 A1 * | 11/2012 | Pollard | ............ | C10B 53/02 |
| | | | | 508/110 |
| 2013/0134074 A1 * | 5/2013 | Soane | ............ | B03D 3/06 |
| | | | | 209/162 |
| 2014/0183104 A1 * | 7/2014 | Rothman | ............ | B07B 1/00 |
| | | | | 209/168 |
| 2014/0197077 A1 * | 7/2014 | Rothman | ............ | B04C 1/00 |
| | | | | 209/163 |
| 2015/0209799 A1 * | 7/2015 | Rothman | ............ | B01D 37/02 |
| | | | | 209/129 |
| 2016/0067631 A1 | 3/2016 | Rothman et al. | | |
| 2016/0090536 A1 * | 3/2016 | Yuan | ............ | C10G 1/047 |
| | | | | 208/390 |
| 2017/0151573 A1 * | 6/2017 | Coomer | ............ | B01D 21/267 |
| 2017/0326559 A1 * | 11/2017 | Filmer | ............ | B02C 23/08 |
| 2020/0261920 A1 * | 8/2020 | Sherman | ............ | B02C 23/12 |

FOREIGN PATENT DOCUMENTS

| | | |
|---|---|---|
| WO | 2013130794 A1 | 9/2013 |
| WO | 2015168743 A2 | 11/2015 |
| WO | 2018068049 A1 | 4/2018 |
| WO | 2018085364 A1 | 5/2018 |
| WO | 2018085490 A1 | 5/2018 |
| WO | 2018160628 A1 | 9/2018 |
| WO | 2018160648 A1 | 9/2018 |
| WO | 2018160793 A1 | 9/2018 |
| WO | 2018160817 A1 | 9/2018 |

* cited by examiner

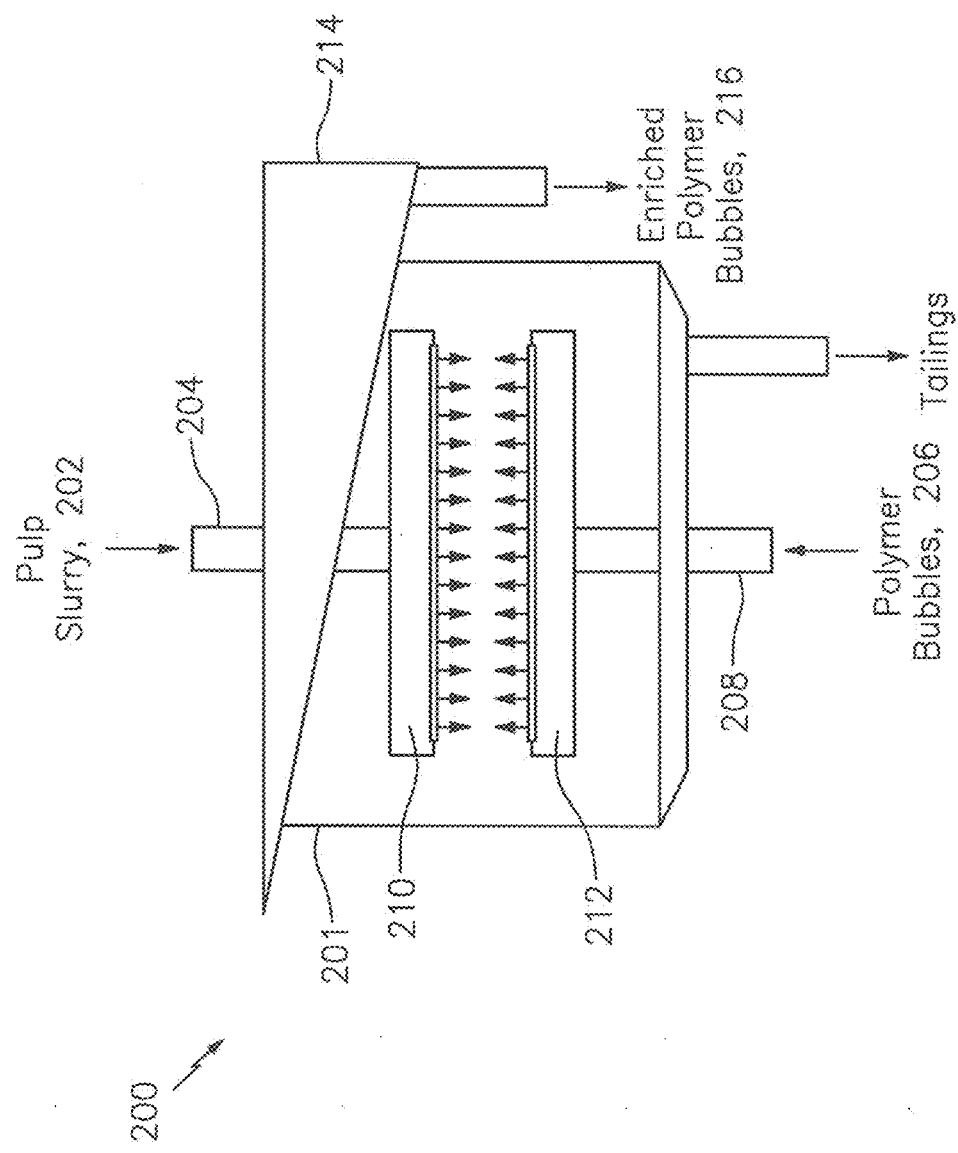

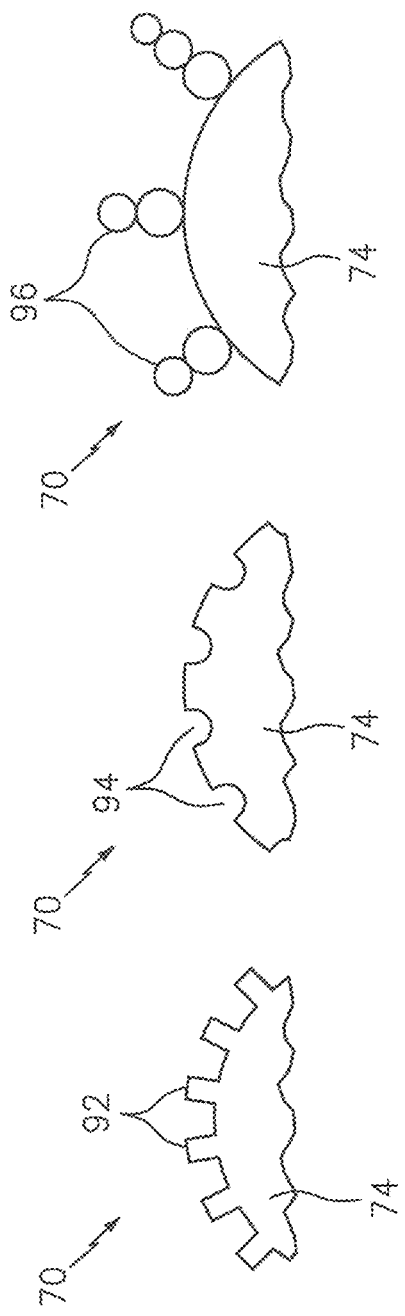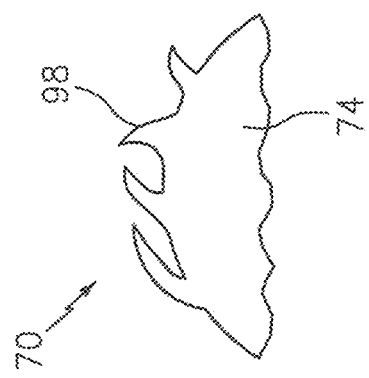
FIG. 5a
FIG. 5b
FIG. 5c
FIG. 5d

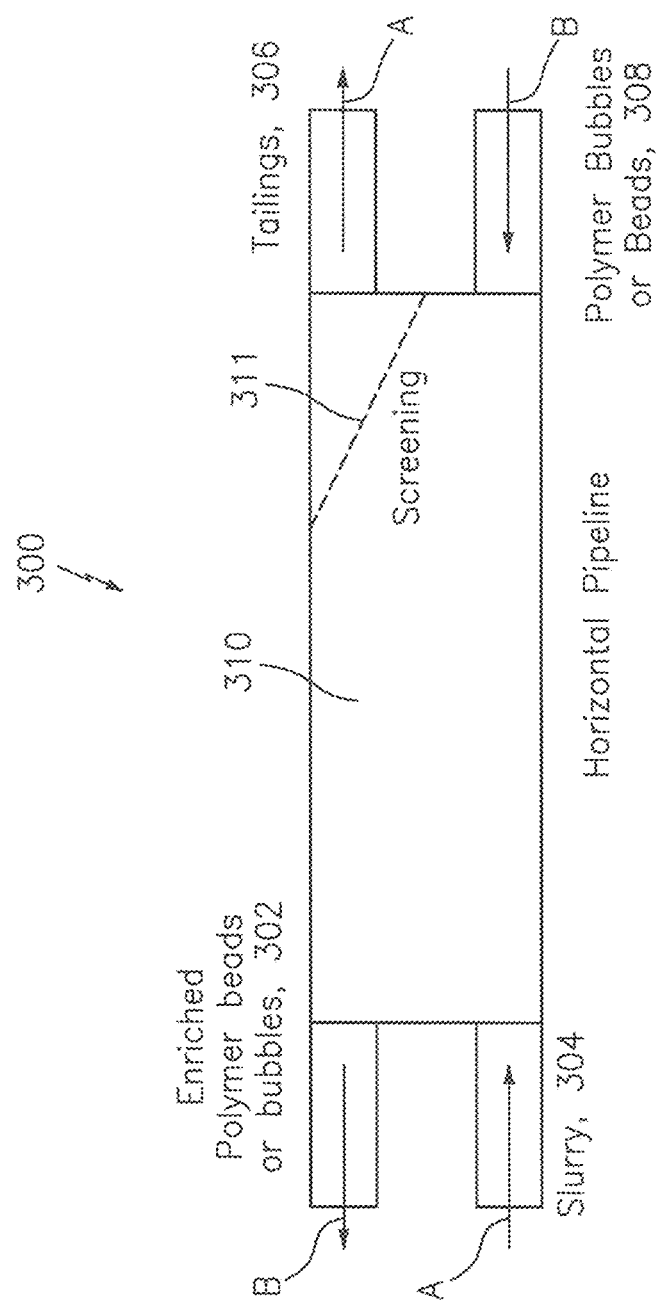
FIG. 12: Separation of Sized-Based Bubbles or Beads Using Countercurrent Flows with Mixing

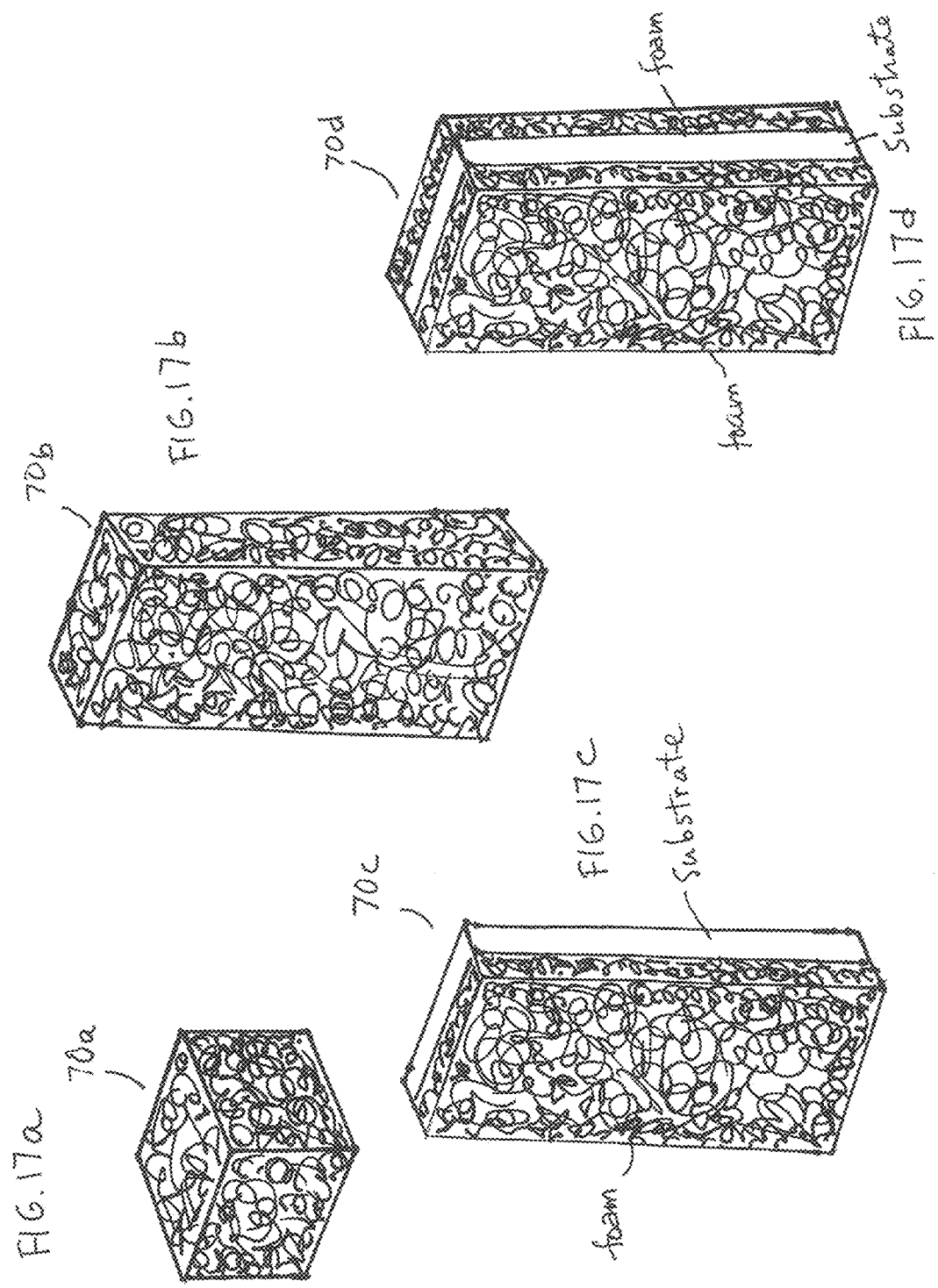

Reticulated Foam with Cu Mineral entrained throughout the structure

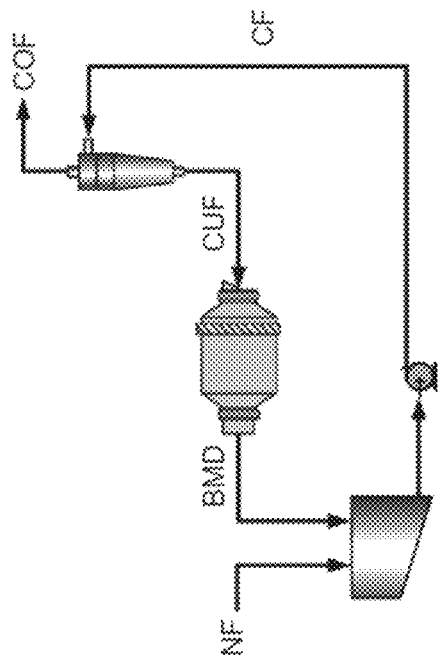
Figure 23: Basic flowsheet showing the placement of a hydrocyclone as a classifying step in a comminution circuit, where NF = new feed, BMD = ball mill discharge, CF = cyclone feed, CUF = cyclone underflow, COF = cyclone overflow. (Prior art, see Wills & Finch, 2016)

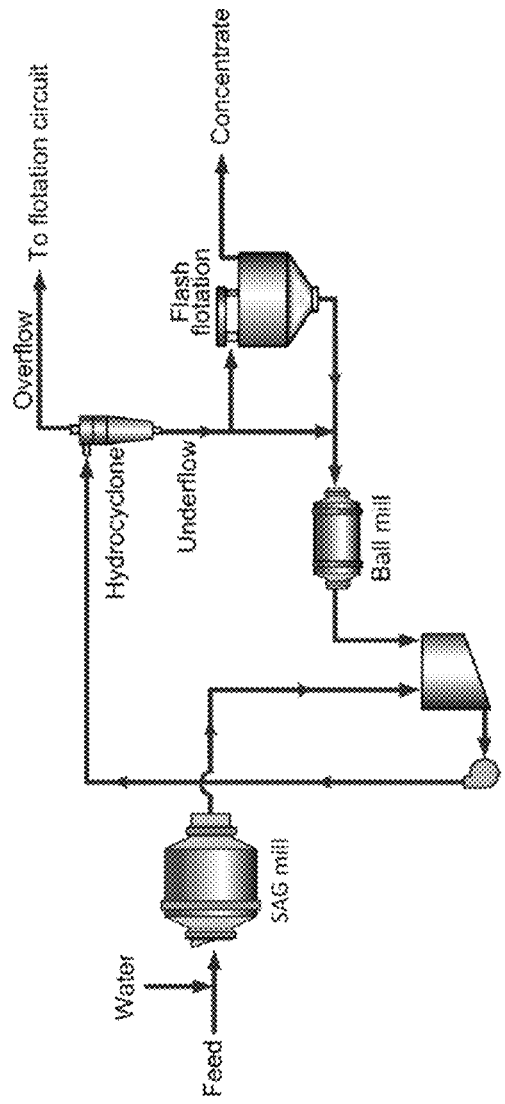
Figure 24: Typical flash flotation circuit (Prior art, see Wills & Finch, 2016)

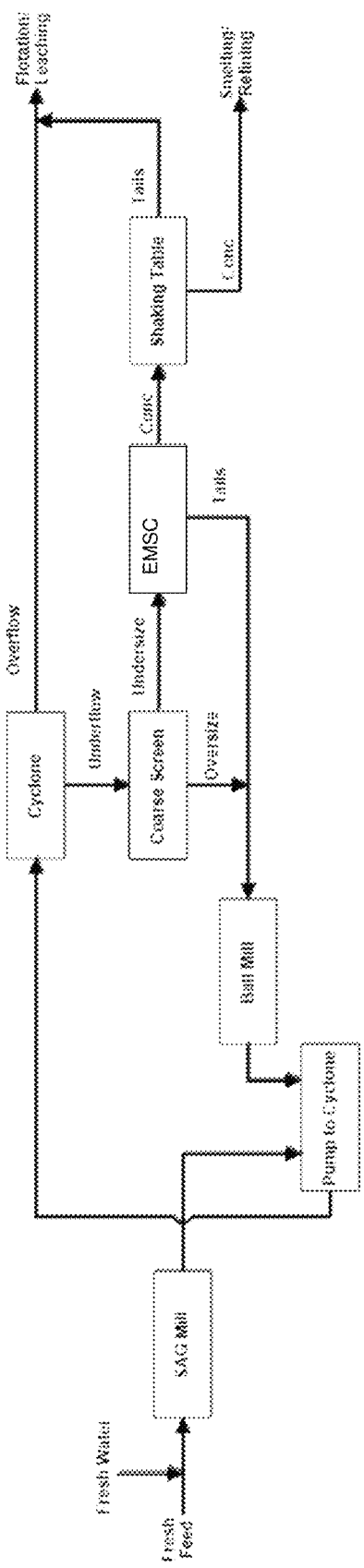
Figure 25: EMSC cyclone underflow scavenging process layout with EMSC tails sent to ball mill
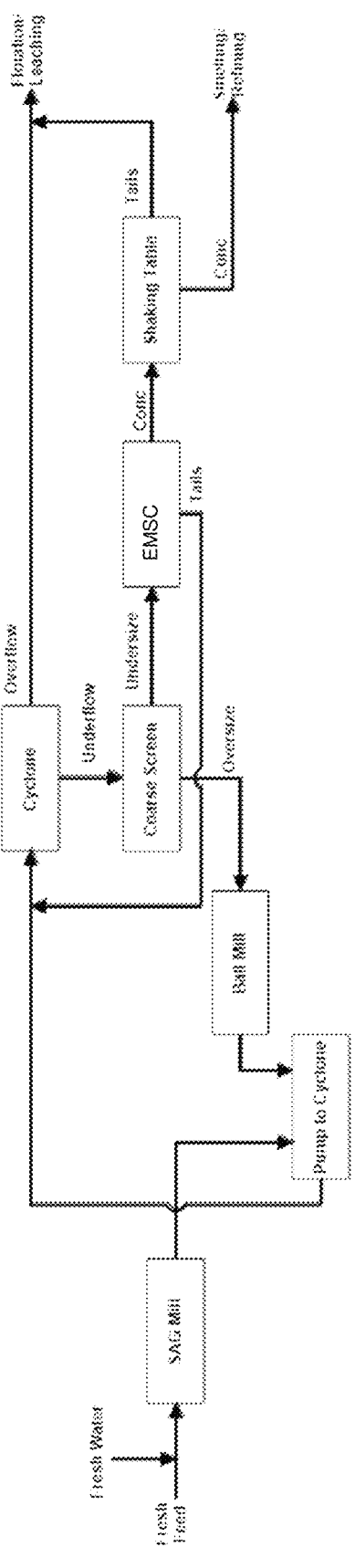
Figure 26: EMSC cyclone underflow scavenging process layout with EMSC tails sent to cyclone

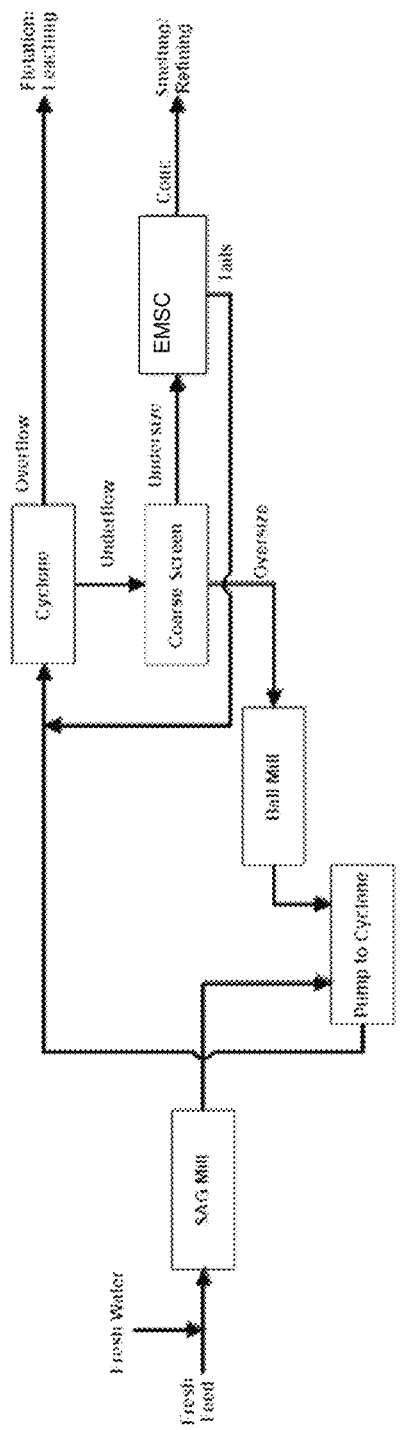
Figure 27: EMSC cyclone underflow scavenging process layout with EMSC tails sent to ball mill and EMSC concentrate sent directly to gold smelting
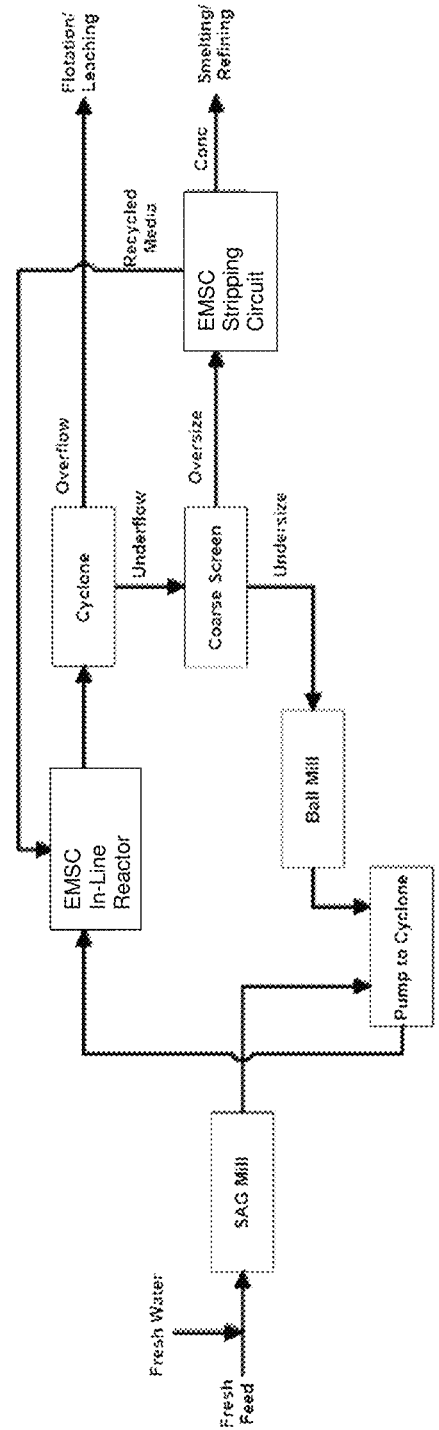
Figure 28: EMSC cyclone feed scavenging process layout with high specific gravity, coarse-sized media separated from cyclone underflow using screens

CYCLONE UNDERFLOW SCAVENGERING PROCESS USING ENHANCED MINERAL SEPARATION CIRCUITS (EMSC)

CROSS-REFERENCE TO RELATED PATENT APPLICATIONS

This application claims the benefit of U.S. Provisional Application No. 62/465,250 (712-2.446 (CCS-0188)), filed 1 Mar. 2017, which is both incorporated by reference herein in their entirety.

This application is also related to, and builds on, technology disclosed in an earlier-filed patent application Ser. No. 15/401,755 (712-2.428-1 (CCS-0187)), filed 9 Jan. 2017, claiming benefit to provisional application Ser. No. 62/276,051 and 62/405,569, both filed 7 Jan. 2016, and all hereby incorporated by reference in their entirety.

BACKGROUND OF THE INVENTION

1. Technical Field

This invention relates generally to techniques for separating valuable material from unwanted material in a mixture, such as a pulp slurry; and more particularly, relates to a method and apparatus for separating valuable material from unwanted material in a mixture, such as a pulp slurry, e.g., using an engineered collection media.

2. Description of Related Art

In many industrial processes, flotation is used to separate valuable or desired material from unwanted material. By way of example, in this process a mixture of water, valuable material, unwanted material, chemicals and air is placed into a flotation cell. The chemicals are used to make the desired material hydrophobic and the air is used to carry the material to the surface of the flotation cell. When the hydrophobic material and the air bubbles collide they become attached to each other. The bubble rises to the surface carrying the desired material with it.

The performance of the flotation cell is dependent on the air bubble surface area flux and air bubble size distribution in the collection zone of the cell. The air bubble surface area flux is dependent on the size of the bubbles and the air injection rate. Controlling the air bubble surface area flux has traditionally been very difficult. This is a multivariable control problem and there are no dependable real time feedback mechanisms to use for control.

There is a need in the industry to provide a better way to separate valuable material from unwanted material, e.g., including in such a flotation cell, so as to eliminate problems associated with using air bubbles in such a separation process.

SUMMARY OF THE INVENTION

By way of example, and according to some embodiments, the present invention may take the form of a system for processing a circulating load in comminution circuit of a mineral separation process for separating mineral particles of interest from an ore, featuring: a coarse screen and an enhanced mineral separation circuit (EMSC).

The coarse screen may be configured to receive a cyclone underflow having mineral particles of interest and forming part of the circulating load of the comminution circuit, and provide coarse screen feeds for further processing.

The enhanced mineral separation circuit may include a collection processor configured to receive one of the coarse screen feeds, and may also include at least one collection apparatus located in the collection processor, the at least one collection apparatus having a collection surface configured with a functionalized polymer comprising a plurality of molecules having a functional group configured to attract the mineral particles of interest to the collection surface, and provide enhanced mineral separation circuit feeds for further processing in the system.

The system may also include one or more of the following features:

According to some embodiments, the collection processor may be configured to receive an undersize coarse screen feed as one of the coarse screen feeds, and provide tails as one of the enhanced mineral separation circuit feeds for further processing.

According to some embodiments, the system may include a ball mill configured to receive the tails for further processing.

According to some embodiments, the system may include a cyclone configured to receive the tails for further processing.

According to some embodiments, the cyclone may be configured to provide the cyclone underflow back to the coarse screen for further processing and a cyclone overflow for further processing, including as part of a flotation/leaching process.

According to some embodiments, the collection processor may be configured to provide concentrate as another one of the enhanced mineral separation circuit feeds for further processing.

According to some embodiments, the system may include a shaking table configured to receive the concentrate and provide shack table tails and shake table concentrate for further processing. By way of example, the shack table tails may be further processed with the cyclone overflow as part of a flotation/leaching process. By way of further example, the shack table concentrate may be further processed as part of a smelting/refining process.

According to some embodiments, the coarse screen may be configured to provide an oversize coarse screen feed as another one of the coarse screen feeds; and the ball mill may be configured to receive the oversize coarse screen feed for further processing with the tails, and provide a ball mill feed for further processing.

According to some embodiments, the system may include a cyclone configured to provide the cyclone underflow; and the system may include a pump to cyclone configured to receive the ball mill feed and a SAG mill feed, and provide a pump-to-cyclone feed to the cyclone for further processing. By way of example, the cyclone may further process the pump-to-cyclone feed alone, or may further process the pump-to-cyclone feed together with the tails received from the collection processor.

According to some embodiments, the coarse screen may be configured to provide an oversize coarse screen feed as another one of the coarse screen feeds; and the system may include a ball mill configured to receive the oversize coarse screen feed alone, and provide a ball mill feed.

According to some embodiments, the enhanced mineral separation circuit may include a stripping circuit configured to receive an oversize coarse screen feed as another one of the coarse screen feeds, and provide recycled media that is stripped of the mineral particles of interest as one of the enhanced mineral separation circuit feeds. In effect, and according to some embodiments, the recycled media may be reused with the collection surface configured with the functionalized polymer comprising the plurality of molecules having the functional group configured to attract the mineral particles of interest to the collection surface.

According to some embodiments, the stripping circuit may also be configured to provide a stripping circuit concentrate for further processing, e.g., including where the stripping circuit concentrate is further processed as part of smelting/refining process.

According to some embodiments, the enhanced mineral separation circuit may include an in-line reactor configured to receive the recycled media.

According to some embodiments, the coarse screen may be configured to provide an undersize coarse screen feed as one of the coarse screen feed; the system may include a ball mill configured to receive the undersize coarse screen feed, and provide a ball mill feed; the cyclone may be configured to provide the cyclone underflow; the system may include a pump to cyclone configured to receive the ball mill feed and a SAG mill feed, and provide a pump-to-cyclone feed; and the in-line reactor may be configured to receive the pump-to-cyclone feed for further processing with the recycled media.

The Collection Processor

The functional group may include an ionizing bond for bonding the mineral particles of interest to the molecules.

The synthetic material may be selected from a group consisting of polyamides, polyesters, polyurethanes, phenol-formaldehyde, urea-formaldehyde, melamine-formaldehyde, polyacetal, polyethylene, polyisobutylene, polyacrylonitrile, poly(vinyl chloride), polystyrene, poly(methyl methacrylates), poly(vinyl acetate), poly(vinylidene chloride), polyisoprene, polybutadiene, polyacrylates, poly(carbonate), phenolic resin, and polydimethylsiloxane.

The functional group may be configured to render the collection area hydrophobic.

The synthetic material may be selected from a group consisting of polystyrene, poly(d,l-lactide), poly(dimethylsiloxane), polypropylene, polyacrylic, polyethylene, hydrophobically-modified ethyl hydroxyethyl cellulose polysiloxanates, alkylsilane and fluoroalkylsilane.

The mineral particles of interest may have one or more hydrophobic molecular segments attached thereon, and the tailings have a plurality of molecules, each collector molecule comprising a first end and a second end, the first end comprising the functional group configured to attach to the mineral particles of interest, the second end comprising a hydrophobic molecular segment.

The synthetic material may include a siloxane derivative.

The synthetic material may comprise polysiloxanates or hydroxyl-terminated polydimethylsiloxanes.

The collection surface may be configured to contact the tailings over a period of time for providing an enriched collection surface in the collection apparatus, containing the mineral particles of interest, and the system may also include a release processor configured to receive the collection apparatus having the enriched collection surface, the release processor further configured to provide a release medium for releasing the mineral particles of interest from the enriched collection surface.

The release medium may include a liquid configured to contact with the enriched collection surface, the liquid having a pH value ranging from 0 to 7.

The release medium may include a liquid configured to contact with the enriched collection surface, and the system may also include an ultrasound source configured to apply ultrasound waves to the enriched collection area for releasing the mineral particles of interest from the enriched collection surface.

A part of the collection surface may be configured to have the molecules attached thereto, wherein the molecules comprise collectors. Another part of the collection surface may be configured to be hydrophobic.

A part of the collection surface is configured to be hydrophobic.

Reticulated Foam and/or Foam Block

The at least one collection apparatus may include reticulated foam and/or a reticulated foam block providing the three-dimensional open-cell structure.

The three-dimensional open-cell structure reticulated foam an open cell foam.

The open cell foam may be made from a material or materials selected from a group that includes polyester urethanes, polyether urethanes, reinforced urethanes, composites like PVC coated PU, non-urethanes, as well as metal, ceramic, and carbon fiber foams and hard, porous plastics, in order to enhance mechanical durability.

The open cell foam may be coated with polyvinylchloride, and then coated with a compliant, tacky polymer of low surface energy in order to enhance chemical durability.

The open cell foam may be primed with a high energy primer prior to application of a functionalized polymer coating to increase the adhesion of the functionalized polymer coating to the surface of the open cell foam.

The surface of the open cell foam may be chemically or mechanically abraded to provide "grip points" on the surface for retention of the functionalized polymer coating.

The surface of the open cell foam may be coated with a functionalized polymer coating that covalently bonds to the surface to enhance the adhesion between the functionalized polymer coating and the surface.

The surface of the open cell foam may be coated with a functionalized polymer coating in the form of a compliant, tacky polymer of low surface energy and a thickness selected for capturing certain mineral particles and collecting certain particle sizes, including where thin coatings are selected for collecting proportionally smaller particle size fractions and thick coatings are selected for collecting additional large particle size fractions.

The specific surface area may be configured with a specific number of pores per inch that is determined to target a specific size range of mineral particles in the slurry.

The at least one collection apparatus may include different open cell foams having different specific surface areas that are blended to recover a specific size distribution of mineral particles in the slurry.

BRIEF DESCRIPTION OF THE DRAWING

Referring now to the drawing, which is not necessarily drawn to scale, the foregoing and other features and advantages of the present invention will be more fully understood from the following detailed description of illustrative embodiments, taken in conjunction with the accompanying drawing in which like elements are numbered alike:

FIG. 2 is a diagram of a flotation cell or column that may be used in place of the flotation cell or column that forms part of the flotation system, process or apparatus shown in FIG. 1 according to some embodiments of the present invention.

FIG. 5*a* illustrates the surface of a synthetic bead with grooves and/or rods, according to some embodiments of the present invention.

FIG. 5*b* illustrates the surface of a synthetic bead with dents and/or holes, according to some embodiments of the present invention.

FIG. 5*c* illustrates the surface of a synthetic bead with stacked beads, according to some embodiments of the present invention.

FIG. 5*d* illustrates the surface of a synthetic bead with hair-like physical structures, according to some embodiments of the present invention.

FIG. 12 is a diagram of an apparatus using counter-current flow for mineral separation, according to some embodiments of the present invention.

FIG. 17*a* illustrates a collection media taking the form of an open-cell foam in a cubic shape.

FIG. 17*b* illustrates a filter according to some embodiments of the present invention.

FIG. 17*c* illustrates a section of a membrane or conveyor belt according to an embodiment of the present invention.

FIG. 17*d* illustrates a section of a membrane or conveyor belt according to another embodiment of the present invention.

FIG. 23 shows a basic flowsheet showing the placement of a hydrocyclone as a classifying step in a comminution circuit that is known in the art.

FIG. 24 shows a typical flash flotation circuit that is known in the art.

FIG. 25 shows an EMSC cyclone underflow scavenging process layout with EMSC tails sent to ball mill, according to some embodiments of the present invention.

FIG. 26 shows an EMSC cyclone underflow scavenging process layout with EMSC tails sent to cyclone, according to some embodiments of the present invention.

FIG. 27 shows an EMSC cyclone underflow scavenging process layout with EMSC tails sent to ball mill and EMSC concentrate sent directly to gold smelting, according to some embodiments of the present invention.

FIG. 28 shows an EMSC cyclone feed scavenging process layout with high specific gravity, coarse-sized media separated from cyclone underflow using screens, according to some embodiments of the present invention.

DETAILED DESCRIPTION OF THE INVENTION

Figure 1:
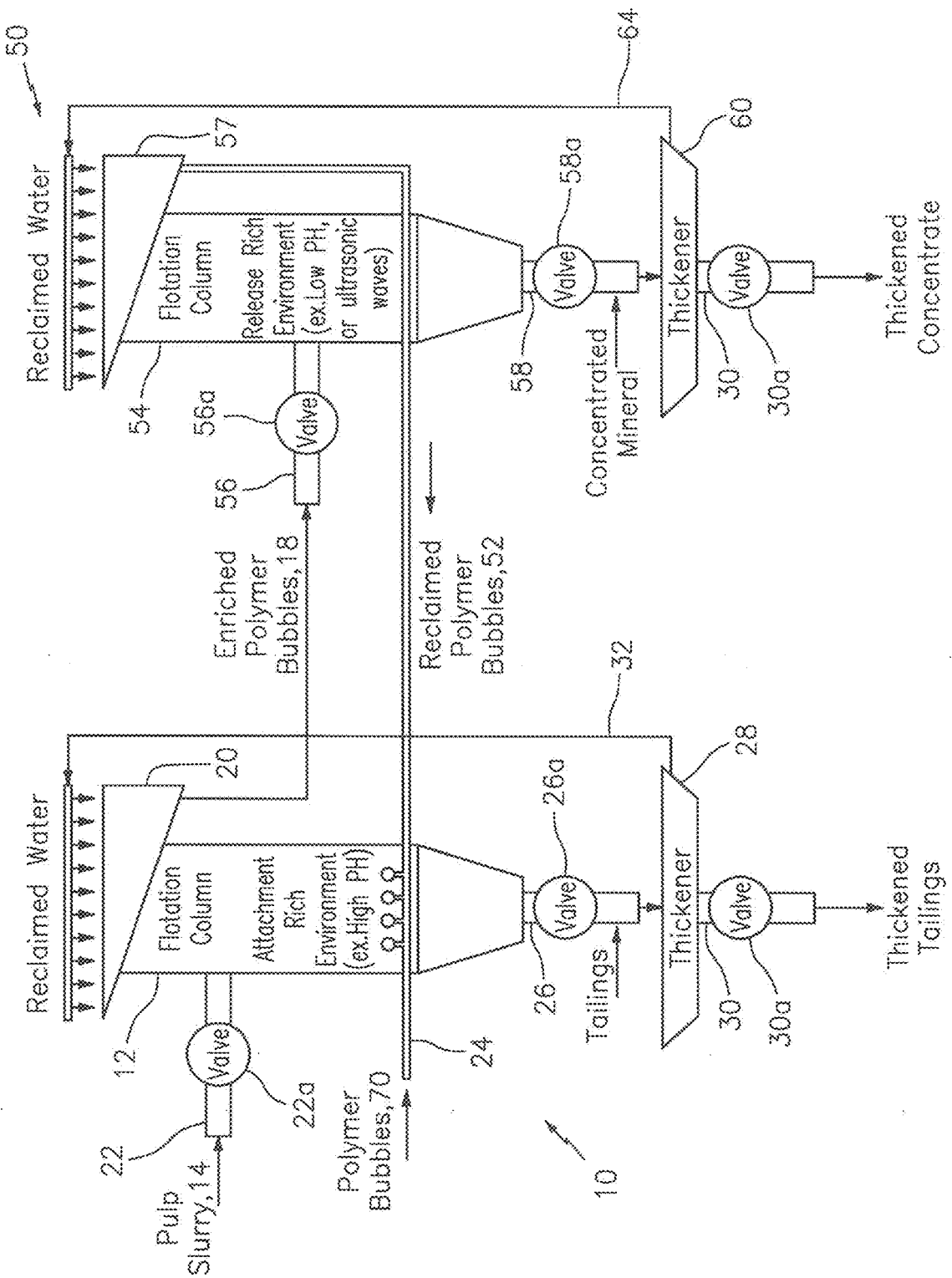
FIG. 1 is a diagram of a flotation system, process or apparatus according to some embodiments of the present invention.

This application includes FIGS. 1-28, e.g., including FIGS. 1-22 showing the subject matter from an earlier-filed application, which forms the basis for the assignee's enhanced mineral separation circuit (EMSC), and FIGS. 23 through 28 showing the subject matter that forms the basis for this new technology, e.g., as part of an EMSC cyclone underflow scavengering process consistent with that disclosed herein. This application builds on a family of enhanced mineral separation technology developed by the assignee of the present application.

In particular, the present invention covers the application of a novel mineral separation process to the recovery of precious metals and precious metal-bearing minerals within a mineral processing comminution circuit. Current size reduction technology in mineral processing commonly requires a classification process at the discharge of a given comminution unit in order to maintain a consistently sized product from the comminution circuit. One of the most common technologies to accomplish this is the hydrocyclone, which relies on the interplay of centrifugal forces and fluid drag forces on a particle to separate mineral particles based on size. Fine particles tend to report to the overflow discharge of the hydrocyclone and coarse particles to the underflow discharge. The coarse particle stream from the hydrocyclone underflow is typically referred to as the circulating load of the comminution circuit.

The effectiveness of hydrocyclone classification may be substantially affected by the specific gravity of different minerals, with particles of higher specific gravity reporting preferentially to the cyclone underflow (See the cyclone underflow (CUF) in FIG. 23). Minerals with very high specific gravities such as certain sulfides and especially gold will tend to preferentially report to the coarse discharge of the classification unit and therefore pass through the comminution unit multiple times (FIG. 23). Gold particles suffer from both high specific gravity and the fact that gold grinds quite slowly due to its soft nature. It has been estimated that a coarse (>75 $\mu$m) gold particle will recycle through the ball mill (FIG. 23) between 50 and 100 times because of these two factors (See that disclosed in Laplante, A. R., 2000, as referenced below).

The presence of large contents of valuable, high specific gravity, precious metals in the circulating load of a comminution circuit has necessitated the introduction of separation technologies for these streams to improve precious metal recovery and improve overall process efficiency. There are two main technologies that are currently in use industrially. The first technology is referred to as flash flotation, whereby a froth flotation cell specifically designed for coarse particle discharge is introduced into the circuit to treat a portion of the cyclone underflow. FIG. 24 shows an example of such a flowsheet arrangement of such a flash flotation circuit. The second technology is commonly referred to as a batch centrifugal concentrator (BCC) which consists of a centrifuge specifically designed to allow for the selective concentration of high specific gravity mineral particles. FIG. 23 shows the arrangement with a BCC is similar to that shown in FIG. 24 with the BCC unit replacing the flash flotation cell.

Each of these separation technologies suffers from limitations in terms of particle size: flash flotation works best for recovering particle size ranges <212 $\mu$m (especially <106 $\mu$m), and BCC units are the preferred option for particles >212 $\mu$m. The flash flotation technique is still subject to common problems affecting flotation such as non-selective entrainment of gangue particles, especially in the size range of <25 $\mu$m. This lack of selectivity in fine particle size ranges is especially significant as free gold particles in this size class (<25 $\mu$m) will constitute 75-95% of the gold mass reporting to the cyclone underflow after classification (Laplante, A. R., 2000).

EMSC Technology

The present invention centers on an improved method of treating the circulating load of comminution circuits to recover valuable precious metals and precious metal-bearing particles using the EMSC technology developed by the assignee of the instant patent application, which includes the family of technologies identified herein. This EMSC technology is able to recover hydrophobic minerals with high selectivity from wide ranges of particle sizes (up to ~5 mm) without any degree of non-selective entrainment, even at very fine particle sizes. This application of EMSC would provide the following benefits:

Simplified process design as no trade-off (flash flotation vs. BCC) would be required for the treatment of a wide range of particle sizes Limitations in fine particle recovery with existing technologies would not apply, e.g., including:
  No entrainment (flash flotation)
  No lower particle size limit (BCC)

By way of example, the use of EMSC technology in this application can be seen in the EMSC cyclone underflow scavenging processes shown in FIGS. 25-27. In these figures the cyclone underflow, or a portion thereof, is sent directly to a coarse screen which allows the coarsest particles to bypass separation and report directly to the ball mill feed. The undersize feed from the screening step is then passed to an EMSC separation circuit to remove all of the hydrophobic mineral particles. Depending on the mineralogy of the given deposit, the concentrate from the EMSC separation circuit may then be fed to a shaking table for final upgrade before smelting or refining (see that shown in FIGS. 25 and 26), or proceed straight to the smelting stage (see that shown in FIG. 27). In configurations that include a shaking table (FIGS. 25 and 26), the tails of the shaking table separation are then combined with the cyclone underflow to proceed to a flotation or leaching process. The tails of the EMSC separation may be fed to the ball mill (FIG. 25) or recirculated to the cyclone feed (FIGS. 26 and 27). The advantage of recirculating the EMSC tails to the cyclone feed is that this effectively doubles the opportunities for proper classification of this stream.

An alternate embodiment of the present invention is shown in FIG. 28, e.g. where an EMSC reactor is separated into two components: an EMSC in-line reactor added to the discharge line of the cyclone feed pump to treat the full cyclone feed stream and a separate EMSC stripping circuit to remove the precious metal concentrate and allow the media to be recycled and reused. The configuration in FIG. 28 requires that the EMSC media be relatively coarse and high specific gravity such that all of the loaded media will report to the cyclone underflow where it can consequently be separated from the circulating load using a coarse screening step. The screened media then passes to the EMSC stripping circuit, e.g. where the concentrate is separated from the media and the EMSC media is recycled back to the in-line reactor. The advantage of this layout is that the entire cyclone feed stream may be treated, rather than only a bleed stream from the cyclone underflow discharge.

Techniques for stripping the concentrate and/or mineral particles of interest from the collection surface, e.g., so as to obtain recycled media, are known in the art, and disclosed in further detail below in relation to FIGS. 1-22. The scope of the invention is not intended to be limited to any particular type or kind of stripping circuit that is known in the art, disclosed herein, or developed in the future.

Moreover, techniques for treating the full cyclone feed stream with the recycled media, so as to obtain the mineral particle of interest from the full cyclone feed stream, are known in the art, and disclosed in further detail below in relation to FIGS. 1-22. The scope of the invention is not intended to be limited to any particular type or kind of in-line reaction technology or treating technique that is known in the art, disclosed herein, or developed in the future.

In all of the outlined process configurations (FIGS. 25-28), the SAG mill may be a rod mill, a crushing circuit or any other such comminution circuit as would be known to one skilled in the art. Similarly, the ball mill shown in these configurations may be a regrind mill, a vertically stirred mill, a high-intensity grinding mill, or any such similar comminution equipment as would be known to one skilled in the art. The decision on the exact process configuration must be site-specific and consider upstream and downstream process limitations as well as the mineralogy of the ore to be treated.

The advantages of the described process configurations overlap with existing strategies to recover precious metals from circulating loads in comminution circuits in that:

Circulating loads are reduced, and
Precious metal recovery is increased.
The improvements offered by this invention are:
Improved recoveries over wider size ranges than are possible with either existing technology, and
Increased grade in fine particle sizes (relative to flash flotation) due to the lack of entrainment.

FIG. 1-22 of the Earlier-Filed Application

FIGS. 1-22 of the earlier-filed application disclose example of implementations of the EMSC technology developed by the assignee of the instant application that may be used in conjunction with the present invention, as follows:

FIG. 1

By way of example, FIG. 1 shows the present invention is the form of apparatus 10, having a flotation cell or column 12 configured to receive a mixture of fluid (e.g. water), valuable material and unwanted material, e.g., a pulp slurry 14; receive synthetic bubbles or beads 70 (FIG. 3a to FIG. 5d) that are constructed to be buoyant when submerged in the pulp slurry or mixture 14 and functionalized to control the chemistry of a process being performed in the flotation cell or column, including to attach to the valuable material in the pulp slurry or mixture 14; and provide enriched synthetic bubble or beads 18 having the valuable material attached thereon. The terms "synthetic bubbles or beads" and "polymer bubbles or beads" are used interchangeably in this disclosure. The terms "valuable material", "valuable mineral" and "mineral particle" are also used interchangeably. By way of example, the synthetic bubbles or beads 70 may be made from polymer or polymer-based materials, or silica or silica-based materials, or glass or glass-based materials, although the scope of the invention is intended to include other types or kinds of material either now known or later developed in the future. For the purpose of describing one example of the present invention, in FIG. 1 the synthetic bubbles or beads 70 and the enriched synthetic bubble or beads 18 are shown as enriched polymer or polymer-based bubbles labeled 18. The flotation cell or column 12 is configured with a top portion or piping 20 to provide the enriched polymer or polymer-based bubbles 18 from the flotation cell or column 12 for further processing consistent with that set forth herein.

The flotation cell or column 12 may be configured with a top part or piping 22, e.g., having a valve 22a, to receive the pulp slurry or mixture 14 and also with a bottom part or piping 24 to receive the synthetic bubbles or beads 70. In operation, the buoyancy of the synthetic bubbles or beads 70 causes them to float upwardly from the bottom to the top of the flotation cell or column 12 through the pulp slurry or mixture 14 in the flotation cell or column 12 so as to collide with the water, valuable material and unwanted material in the pulp slurry or mixture 14. The functionalization of the synthetic bubbles or beads 70 causes them to attach to the valuable material in the pulp slurry or mixture 14. As used herein, the term "functionalization" means that the properties of the material making up the synthetic bubbles or beads 70 are either selected (based upon material selection) or modified during manufacture and fabrication, to be "attracted" to the valuable material, so that a bond is formed between the synthetic bubbles or beads 70 and the valuable material, so that the valuable material is lifted through the cell or column 12 due to the buoyancy of the synthetic bubbles or beads 70. For example, the surface of synthetic bubbles or beads has functional groups for collecting the valuable material. Alternatively, the synthetic bubbles or beads are functionalized to be hydrophobic for attracting wetted mineral particles—those mineral particles having collector molecules attached thereto. As a result of the collision between the synthetic bubbles or beads 70 and the water, valuable material and unwanted material in the pulp slurry or mixture 14, and the attachment of the synthetic bubbles or beads 70 and the valuable material in the pulp slurry or mixture 14, the enriched polymer or polymer-based bubbles 18 having the valuable material attached thereto will float to the top of the flotation cell 12 and form part of the froth formed at the top of the flotation cell 12. The flotation cell 12 may include a top part or piping 20 configured to provide the enriched polymer or polymer-based bubbles 18 having the valuable material attached thereto, which may be further processed consistent with that set forth herein. In effect, the enriched polymer or polymer-based bubbles 18 may be taken off the top of the flotation cell 12 or may be drained off by the top part or piping 20.

The flotation cell or column 12 may be configured to contain an attachment rich environment, including where the attachment rich environment has a high pH, so as to encourage the flotation recovery process therein. The flotation recovery process may include the recovery of ore particles in mining, including copper. The scope of the invention is not intended to be limited to any particular type or kind of flotation recovery process either now known or later developed in the future. The scope of the invention is also not intended to be limited to any particular type or kind of mineral of interest that may form part of the flotation recovery process either now known or later developed in the future.

According to some embodiments of the present invention, the synthetic bubbles or beads 70 may be configured with a surface area flux by controlling some combination of the size of the polymer or polymer-based bubbles and/or the injection rate that the pulp slurry or mixture 14 is received in the flotation cell or column 12. The synthetic bubbles or beads 70 may also be configured with a low density so as to behave like air bubbles. The synthetic bubbles or beads 70 may also be configured with a controlled size distribution of medium that may be customized to maximize recovery of different feed matrixes to flotation as valuable material quality changes, including as ore quality changes.

According to some embodiments of the present invention, the flotation cell or column 12 may be configured to receive the synthetic bubbles or beads 70 together with air, where the air is used to create a desired froth layer in the mixture in the flotation cell or column 12 in order to achieve a desired grade of valuable material. The synthetic bubbles or beads 70 may be configured to lift the valuable material to the surface of the mixture in the flotation cell or column.

The Thickener 28

The apparatus 10 may also include piping 26 having a valve 26a for providing tailings to a thickener 28 configured to receive the tailings from the flotation cell or column 12. The thickener 28 includes piping 30 having a valve 30a to provide thickened tailings. The thickener 28 also includes suitable piping 32 for providing reclaimed water back to the flotation cell or column 12 for reuse in the process. Thickeners like element 28 are known in the art, and the scope of the invention is not intended to be limited to any particular type or kind either now known or later developed in the future.

The Bead Recovery Process or Processor 50

According to some embodiments of the present invention, the apparatus 10 may further include a bead recovery process or processor generally indicated as 50 configured to receive the enriched polymer or polymer-based bubbles 18 and provide reclaimed polymer or polymer-based bubbles 52 without the valuable material attached thereon so as to enable the reuse of the polymer or polymer-based bubbles 52 in a closed loop process. By way of example, the bead recovery process or processor 50 may take the form of a washing station whereby the valuable mineral is mechanically, chemically, or electro-statically removed from the polymer or polymer-based bubbles 18.

The bead recovery process or processor 50 may include a releasing apparatus in the form of a second flotation cell or column 54 having piping 56 with a valve 56a configured to receive the enriched polymer bubbles or beads 18; and substantially release the valuable material from the polymer bubbles or beads 18, and also having a top part or piping 57 configured to provide the reclaimed polymer bubbles or beads 52, substantially without the valuable material attached thereon The second flotation cell or column 54 may be configured to contain a release rich environment, including where the release rich environment has a low pH, or including where the release rich environment results from ultrasonic waves pulsed into the second flotation cell or column 54.

The bead recovery process or processor 50 may also include piping 58 having a valve 56a for providing concentrated minerals to a thickener 60 configured to receive the concentrated minerals from the flotation cell or column 54.

The thickener 60 includes piping 62 having a valve 62a to provide thickened concentrate. The thickener 60 also includes suitable piping 64 for providing reclaimed water back to the second flotation cell or column 54 for reuse in the process. Thickeners like element 60 are known in the art, and the scope of the invention is not intended to be limited to any particular type or kind either now known or later developed in the future.

Embodiments are also envisioned in which the enriched synthetic beads or bubbles are placed in a chemical solution so the valuable material is dissolved off, or are sent to a smelter where the valuable material is burned off, including where the synthetic beads or bubbles are reused afterwards.

Dosage Control

According to some embodiments of the present invention, the synthetic beads or bubbles 70 may be functionalized to control the chemistry of the process being performed in the cell or column, e.g. to release a chemical to control the chemistry of the flotation separation process.

In particular, the flotation cell or column 12 in FIG. 1 may be configured to receive polymer-based blocks like synthetic beads containing one or more chemicals used in a flotation separation of the valuable material, including mining ores, that are encapsulated into polymers to provide a slow or targeted release of the chemical once released into the flotation cell or column 12. By way of example, the one or more chemicals may include chemical mixes both now known and later developed in the future, including typical frothers, collectors and other additives used in flotation separation. The scope of the invention is not intended to be limited to the type or kind of chemicals or chemical mixes that may be released into the flotation cell or column 12 using the synthetic bubbles according to the present invention.

The scope of the invention is intended to include other types or kinds of functionalization of the synthetic beads or bubbles in order to provide other types or kinds of control of the chemistry of the process being performed in the cell or column, including either functionalization and controls both now known and later developed in the future. For example, the synthetic beads or bubbles may be functionalized to control the pH of the mixture that forms part of the flotation separation process being performed in the flotation cell or column.

FIG. 2: The Collision Technique

FIG. 2 shows alternative apparatus generally indicated as 200 in the form of an alternative flotation cell 201 that is based at least partly on a collision technique between the mixture and the synthetic bubbles or beads, according to some embodiments of the present invention. The mixture 202, e.g. the pulp slurry, may be received in a top part or piping 204, and the synthetic bubbles or beads 206 may be received in a bottom part or piping 208. The flotation cell 201 may be configured to include a first device 210 for receiving the mixture 202, and also may be configured to include a second device 212 for receiving the polymer-based materials. The first device 210 and the second device 212 are configured to face towards one another so as to provide the mixture 202 and the synthetic bubbles or beads 206, e.g., polymer or polymer-based materials, using the collision technique. In FIG. 2, the arrows 210a represent the mixture being sprayed, and the arrows 212a represent the synthetic bubbles or beads 206 being sprayed towards one another in the flotation cell 201.

In operation, the collision technique causes vortices and collisions using enough energy to increase the probability of touching of the polymer or polymer-based materials 206 and the valuable material in the mixture 202, but not too much energy to destroy bonds that form between the polymer or polymer-based materials 206 and the valuable material in the mixture 202. Pumps, not shown, may be used to provide the mixture 202 and the synthetic bubbles or beads 206 are the appropriate pressure in order to implement the collision technique.

By way of example, the first device 210 and the second device 212 may take the form of shower-head like devices having a perforated nozzle with a multiplicity of holes for spraying the mixture and the synthetic bubbles or beads towards one another. Shower-head like devices are known in the art, and the scope of the invention is not intended to be limited to any particular type or kind thereof either now known or later developed in the future. Moreover, based on that disclosed in the instant patent application, a person skilled in the art without undue experimentation would be able to determine the number and size of the holes for spraying the mixture 202 and the synthetic bubbles or beads 206 towards one another, as well as the appropriate pumping pressure in order to provide enough energy to increase the probability of touching of the polymer or polymer-based materials 206 and the valuable material in the mixture 202, but not too much energy to destroy bonds that form between the polymer or polymer-based materials 206 and the valuable material in the mixture 202.

As a result of the collision between the synthetic bubbles or beads 206 and the mixture, enriched synthetic bubbles or beads having the valuable material attached thereto will float to the top and form part of the froth in the flotation cell 201. The flotation cell 201 may include a top part or piping 214 configured to provide enriched synthetic bubbles or beads 216, e.g., enriched polymer bubbles as shown, having the valuable material attached thereto, which may be further processed consistent with that set forth herein.

The alternative apparatus 200 may be used in place of the flotation columns or cells, and inserted into the apparatus or system shown in FIG. 1, and may prove to be more efficient than using the flotation columns or cells.

FIGS. 3a-5d: The Synthetic Bubbles or Beads

The bubbles or beads used in mineral separation are referred herein as synthetic bubbles or beads. At least the surface of the synthetic bubbles or beads has a layer of polymer functionalized to attract or attach to the value material or mineral particles in the mixture. The term "polymer bubbles or beads", and the term "synthetic bubbles or beads" are used interchangeably. The term "polymer" in this specification means a large molecule made of many units of the same or similar structure linked together. The unit can be a monomer or an oligomer which forms the basis of, for example, polyamides (nylon), polyesters, polyurethanes, phenol-formaldehyde, urea-formaldehyde, melamine-formaldehyde, polyacetal, polyethylene, polyisobutylene, polyacrylonitrile, poly(vinyl chloride), polystyrene, poly(methyl methacrylates), poly(vinyl acetate), poly(vinylidene chloride), polyisoprene, polybutadiene, polyacrylates, poly(carbonate), phenolic resin, polydimethylsiloxane and other organic or inorganic polymers. The list is not necessarily exhaustive. Thus, the synthetic material can be hard or rigid like plastic or soft and flexible like an elastomer. While the physical properties of the synthetic beads can vary, the surface of the synthetic beads is chemically functionalized to provide a plurality of functional groups to attract or attach to mineral particles. (By way of example, the term "functional group" may be understood to be a group of atoms responsible for the characteristic reactions of a particular compound, including those define the structure of a family of compounds and determine its properties.)

Figure 3B:
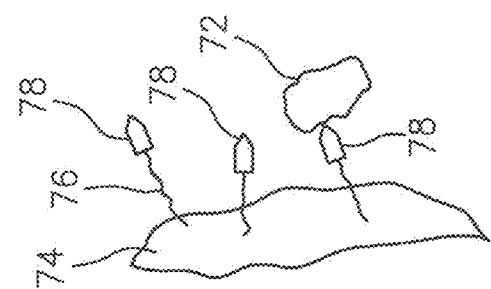
FIG. 3*b* illustrates an enlarged portion of the synthetic bead showing a molecule or molecular segment for attaching a function group to the surface of the synthetic bead, according to some embodiments of the present invention.
Figure 3A:
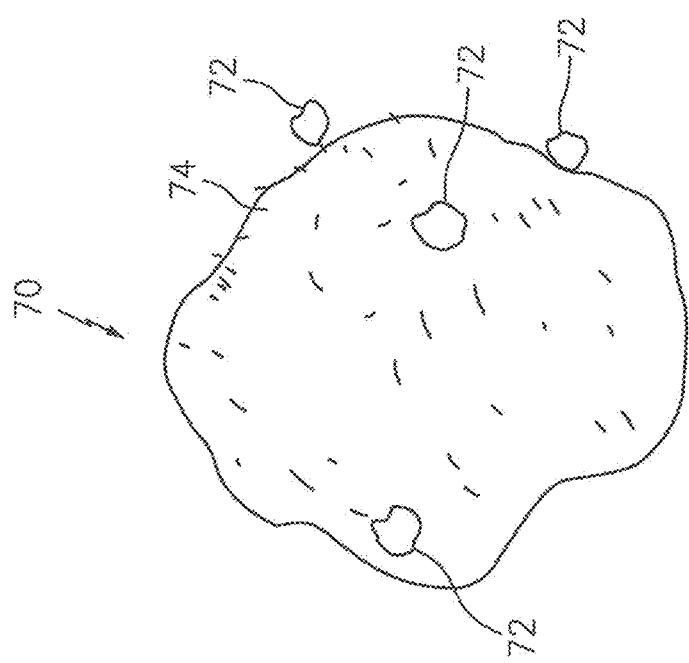
FIG. 3*a* shows a generalized synthetic bead which can be a size-based bead or bubble, weight-based polymer bead and bubble, and magnetic-based bead and bubble, according to some embodiments of the present invention.

For aiding a person of ordinary skill in the art in understanding various embodiments of the present invention, FIG. 3a shows a generalized synthetic bead and FIG. 3b shows an enlarged portion of the surface. The synthetic bead can be a size-based bead or bubble, weight-based polymer bead and bubble, and/or magnetic-based bead and bubble. As shown in FIGS. 3a and 3b, the synthetic bead 70 has a bead body to provide a bead surface 74. At least the outside part of the bead body is made of a synthetic material, such as polymer, so as to provide a plurality of molecules or molecular segments 76 on the surface 74. The molecule 76 is used to attach a chemical functional group 78 to the surface 74. In general, the molecule 76 can be a hydrocarbon chain, for example, and the functional group 78 can have an anionic bond for attracting or attaching a mineral, such as copper to the surface 74. A xanthate, for example, has both the functional group 78 and the molecular segment 76 to be incorporated into the polymer that is used to make the synthetic bead 70. A functional group 78 is also known as a collector that is either ionic or non-ionic. The ion can be anionic or cationic. An anion includes oxyhydryl, such as carboxylic, sulfates and sulfonates, and sulfhydral, such as xanthates and dithiophosphates. Other molecules or compounds that can be used to provide the function group 78 include, but are not limited to, thionocarboamates, thioureas, xanthogens, monothiophosphates, hydroquinones and polyamines. Similarly, a chelating agent can be incorporated into or onto the polymer as a collector site for attracting a mineral, such as copper. As shown in FIG. 3b, a mineral particle 72 is attached to the functional group 78 on a molecule 76. In general, the mineral particle 72 is much smaller than the synthetic bead 70. Many mineral particles 72 can be attracted to or attached to the surface 74 of a synthetic bead 70.

Figure 4C:
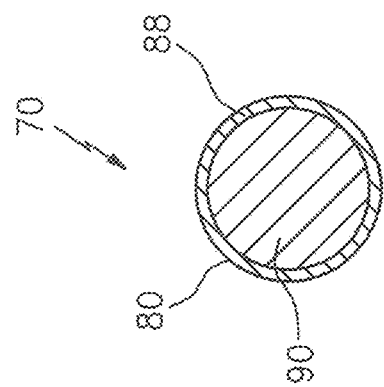
FIG. 4*c* illustrates a synthetic bead with a synthetic coating, according to some embodiments of the present invention.
Figure 4B:
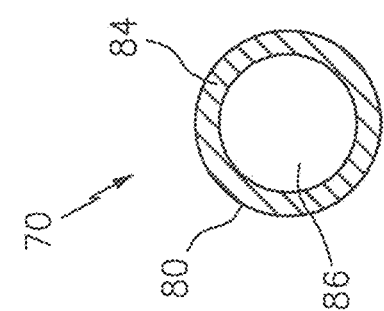
FIG. 4*b* illustrates a synthetic bead with a synthetic shell, according to some embodiments of the present invention.

In some embodiments of the present invention, a synthetic bead has a solid-phase body made of a synthetic material, such as polymer. The polymer can be rigid or elastomeric. An elastomeric polymer can be polyisoprene or polybutadiene, for example. The synthetic bead 70 has a bead body 80 having a surface comprising a plurality of molecules with one or more functional groups for attracting mineral particles to the surface. A polymer having a functional group to collect mineral particles is referred to as a functionalized polymer. In one embodiment, the entire interior part 82 of the synthetic bead 80 is made of the same functionalized material, as shown in FIG. 4a. In another embodiment, the bead body 80 include a shell 84. The shell 84 can be formed by way of expansion, such as thermal expansion or pressure reduction. The shell 84 can be a micro-bubble or a balloon. In FIG. 4b, the shell 84, which is made of functionalized material, has an interior part 86. The interior part 86 can be filled with air or gas to aid buoyancy, for example. The interior part 86 can be used to contain a liquid to be released during the mineral separation process. The encapsulated liquid can be a polar liquid or a non-polar liquid, for example. The encapsulated liquid can contain a depressant composition for the enhanced separation of copper, nickel, zinc, lead in sulfide ores in the flotation stage, for example.

The shell 84 can be used to encapsulate a powder which can have a magnetic property so as to cause the synthetic bead to be magnetic, for example. The encapsulated liquid or powder may contain monomers, oligomers or short polymer segments for wetting the surface of mineral particles when released from the beads. For example, each of the monomers or oligomers may contain one functional group for attaching to a mineral particle and an ion for attaching the wetted mineral particle to the synthetic bead. The shell 84 can be used to encapsulate a solid core, such as Styrofoam to aid buoyancy, for example. In yet another embodiment, only the coating of the bead body is made of functionalized polymer. As shown in FIG. 4c, the synthetic bead has a core 90 made of ceramic, glass or metal and only the surface of core 90 has a coating 88 made of functionalized polymer. The core 90 can be a hollow core or a filled core depending on the application. The core 90 can be a micro-bubble, a sphere or balloon. For example, a filled core made of metal makes the density of the synthetic bead to be higher than the density of the pulp slurry, for example. The core 90 can be made of a magnetic material so that the para-, ferri-, ferro-magnetism of the synthetic bead is greater than the para-, ferri-, ferro-magnetism of the unwanted ground ore particle in the mixture. In a different embodiment, the synthetic bead can be configured with a ferro-magnetic or ferri-magnetic core that attract to paramagnetic surfaces. A core 90 made of glass or ceramic can be used to make the density of the synthetic bead substantially equal to the density of the pulp slurry so that when the synthetic beads are mixed into the pulp slurry for mineral collection, the beads can be in a suspension state.

Figure 4D:
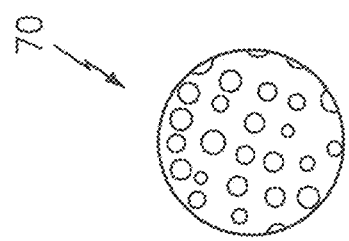
FIG. 4*d* illustrates a synthetic bead taking the form of a porous block, a sponge or a foam, according to some embodiments of the present invention.
Figure 4A:
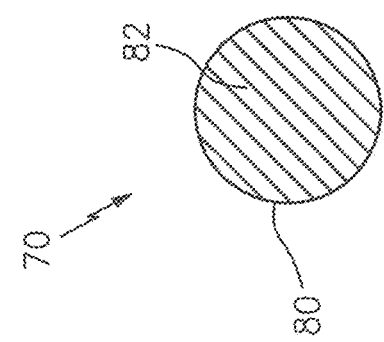
FIG. 4*a* illustrates a synthetic bead having a body made of a synthetic material, according to some embodiments of the present invention.

According to a different embodiment of the present invention, the synthetic bead 70 can be a porous block or take the form of a sponge or foam with multiple segregated gas filled chambers as illustrated in FIG. 4d. The combination of air and the synthetic beads or bubbles 70 can be added to traditional naturally aspirated flotation cell.

It should be understood that the term "bead" does not limit the shape of the synthetic bead of the present invention to be spherical, as shown in FIG. 3. In some embodiments of the present invention, the synthetic bead 70 can have an elliptical shape, a cylindrical shape, a shape of a block. Furthermore, the synthetic bead can have an irregular shape.

It should also be understood that the surface of a synthetic bead, according to the present invention, is not limited to an overall smooth surface as shown in FIG. 3a. In some embodiments of the present invention, the surface can be irregular and rough. For example, the surface 74 can have some physical structures 92 like grooves or rods as shown in FIG. 5a. The surface 74 can have some physical structures 94 like holes or dents as shown in FIG. 5b. The surface 74 can have some physical structures 96 formed from stacked beads as shown in FIG. 5c. The surface 74 can have some hair-like physical structures 98 as shown in FIG. 5d. In addition to the functional groups on the synthetic beads that attract mineral particles to the bead surface, the physical structures can help trapping the mineral particles on the bead surface. The surface 74 can be configured to be a honeycomb surface or sponge-like surface for trapping the mineral particles and/or increasing the contacting surface.

It should also be noted that the synthetic beads of the present invention can be realized by a different way to achieve the same goal. Namely, it is possible to use a different means to attract the mineral particles to the surface of the synthetic beads. For example, the surface of the polymer beads, shells can be functionalized with a hydrophobic chemical molecule or compound. Alternatively, the surface of beads made of glass, ceramic and metal can be coated with hydrophobic chemical molecules or compounds. Using the coating of glass beads as an example, polysiloxanates can be used to functionalize the glass beads in order to make the synthetic beads. In the pulp slurry, xanthate and hydroxamate collectors can also be added therein for collecting the mineral particles and making the mineral particles hydrophobic. When the synthetic beads are used to collect the mineral particles in the pulp slurry having a pH value around 8-9, it is possible to release the mineral particles on the enriched synthetic beads from the surface of the synthetic beads in an acidic solution, such as a sulfuric acid solution. It is also possible to release the mineral particles carrying with the enriched synthetic beads by sonic agitation, such as ultrasonic waves.

The multiplicity of hollow objects, bodies, elements or structures may include hollow cylinders or spheres, as well as capillary tubes, or some combination thereof. The scope of the invention is not intended to be limited to the type, kind or geometric shape of the hollow object, body, element or structure or the uniformity of the mixture of the same. Each hollow object, body, element or structure may be configured with a dimension so as not to absorb liquid, including water, including where the dimension is in a range of about 20-30 microns. Each hollow object, body, element or structure may be made of glass or a glass-like material, as well as some other suitable material either now known or later developed in the future.

By way of example, the multiplicity of hollow objects, bodies, elements or structures that are received in the mixture may include a number in a range of multiple thousands of bubbles or beads per cubic foot of mixture, although the scope of the invention is not intended to be limited per se to the specific number of bubbles. For instance, a mixture of about three thousand cubic feet may include multiple millions of bubbles or beads, e.g., having a size of about 1 millimeter, in three thousand cubic feet of the mixture.

The multiplicity of hollow objects, bodies, elements or structures may be configured with chemicals applied to prevent migration of liquid into respective cavities, unfilled spaces or holes before the wet concrete mixture cures, including where the chemicals are hydrophobic chemicals.

The one or more bubbles may take the form of a small quantity of gas, including air, that is trapped or maintained in the cavities, unfilled spaces, or holes of the multiplicity of hollow objects, bodies, elements or structures.

The scope of the invention is intended to include the synthetic bubbles or beads shown herein being made from a polymer or polymer-based material, or a silica or silica-based, or a glass or glass-based material.

FIGS. 6-11: Releasing Mechanism

Various embodiments of the present invention are envisioned as examples to show that the valuable minerals can be mechanically, chemically, thermally, optically or electro-magnetically removed or released from the enriched synthetic beads or bubbles.

By way of example, the bead recovery process or processor 50 as shown in FIG. 1 can be adapted for the removal of valuable minerals from the enriched synthetic beads or bubbles in different ways. The releasing apparatus may include, or take the form of, a heater 150 (FIG. 6) configured to provide thermal heat for the removal of the valuable minerals from the enriched synthetic beads or bubbles; an ultrasonic wave producer 164 (FIG. 7) configured to provide an ultrasonic wave for the removal of valuable minerals from the enriched synthetic beads or bubbles, a container 168 (FIG. 8) configured to provide an acid or acidic solution 170 for the removal of the valuable minerals from the enriched synthetic beads or bubbles; a microwave source 172 (FIG. 9) configured to provide microwaves for the removal of the valuable minerals from the enriched synthetic beads or bubbles, a motor 186 and a stirrer 188 (FIG. 10) configured to stir the enriched synthetic beads or bubbles for the removal of the valuable minerals from the enriched synthetic beads or bubbles; and multiple release or recovery processors (FIG. 11) configured to use multiple release or recovery techniques for the removal of the valuable minerals from the enriched synthetic beads or bubbles. According to some embodiments of the present invention, the aforementioned releasing apparatus may be responsive to signaling, e.g., from a controller or control processor. In view of the aforementioned, and by way of example, the releasing techniques are set forth in detail below:

Thermally Releasing Valuable Material

Figure 6:
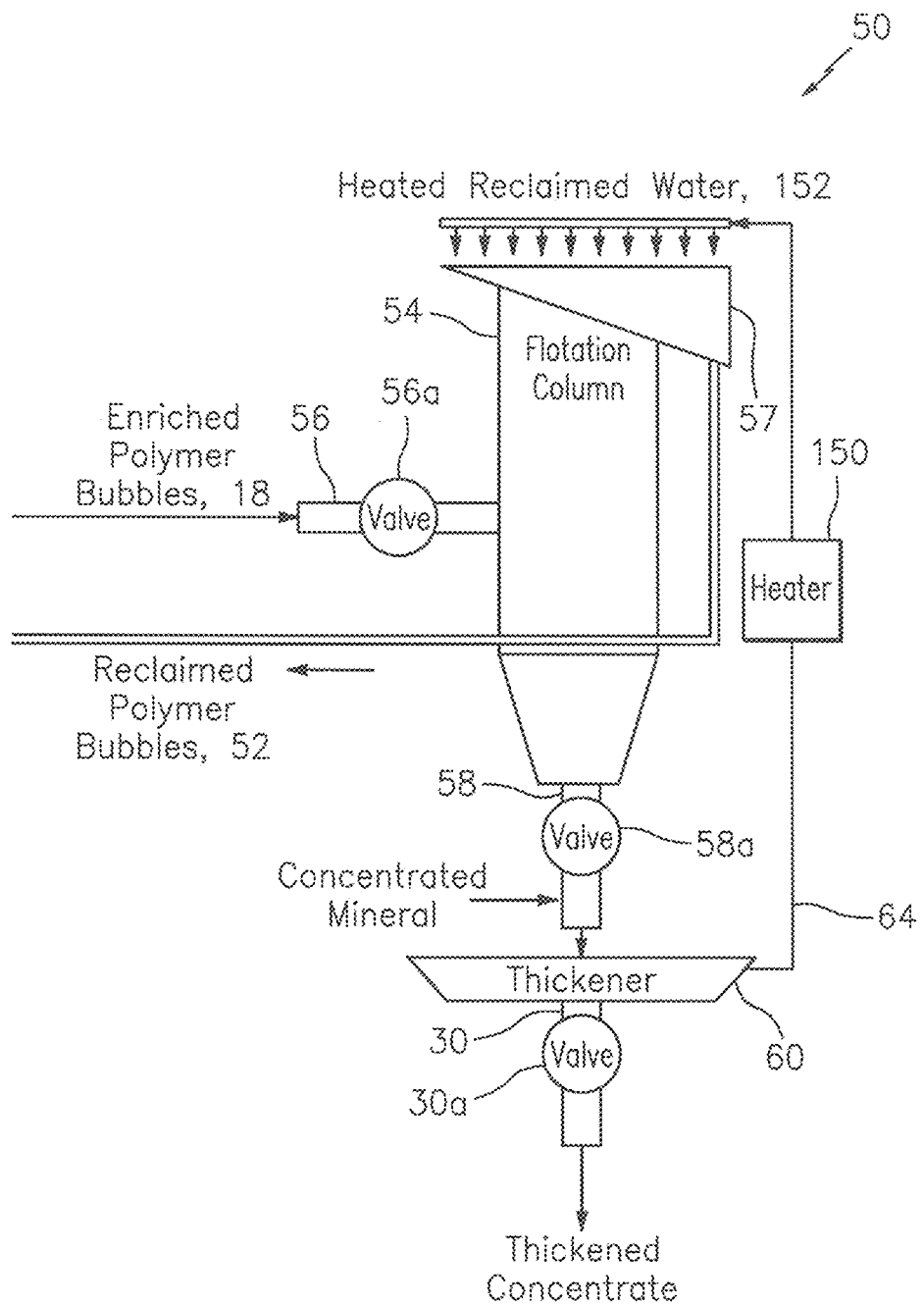
FIG. 6 is a diagram of a bead recovery processor in which the valuable material is thermally removed from the polymer bubbles or beads, according to some embodiments of the present invention.

The synthetic beads or bubbles 70, as shown in FIGS. 3a to 5c, can be made of a polymer which is softened when subjected to elevated temperature. It is known that a polymer may become rubbery above a certain temperature. This is due to the polymer-glass transition at a glass transition temperature, Tg. In general, the physical properties of a polymer are dependent on the size or length of the polymer chain. In polymers above a certain molecular weight, increasing chain length tends to increase the glass transition temperature Tg. This is a result of the increase in chain interactions such as Van der Waals attractions and entanglements that may come with increased chain length. A polymer such as polyvinyl chloride (PVC), has a glass transition temperature around 83 degrees Celsius. If the polymer bubbles or beads 70 have a hair-like surface structures 98 (see FIG. 5d) in order to trap the mineral particles 72 (see FIG. 3b), the hair-like surface structures 98 could become soft. Thus, in a certain polymer at the rubbery state, the hair-like surface structures 98 could lose the ability of holding the mineral particles. Since the separation process as shown in FIGS. 1 and 2 is likely to take place in room temperature or around 23 degrees Celsius. Any temperature, say, higher than 50 degrees Celsius, could soften the hair-like surface structures 98 (see FIG. 5d). For synthetic bubbles or beads 70 made of PVC, a temperature around or higher than 83 degrees Celsius can be used to dislodge the mineral particles from the surface structure of the synthetic bubbles or beads. According to one embodiment of the present invention, the bead recovery process or processor 50 as shown in FIG. 1 can be adapted for removing the mineral particles in the enriched polymer bubbles 18. For example, as the reclaimed water is moved out of the thickener 60 through piping 64, a heater 150 can be used to heat the reclaimed water as shown in FIG. 6. As such, the heated reclaimed water 152 can be arranged to wash the enriched polymer bubbles 18 inside the flotation column 54, thereby releasing at least some of the valuable material or mineral particles attached on the enriched polymer bubbles 18 to piping 58. It is possible to heat the reclaimed water to or beyond the glass transition temperature of the polymer that is used to make the polymer bubbles. The elevated temperature of the heated reclaimed water 152 could also weaken the bonds between the collectors 78 and the mineral particles 72 (see FIG. 3b). It is possible to use a heater to boil the water into steam and to apply the steam to the enriched polymer bubbles. It is also possible to generate superheated steam under a pressure and to apply the superheated steam to the enriched polymer bubbles.

Sonically Releasing Valuable Material

Figure 7:
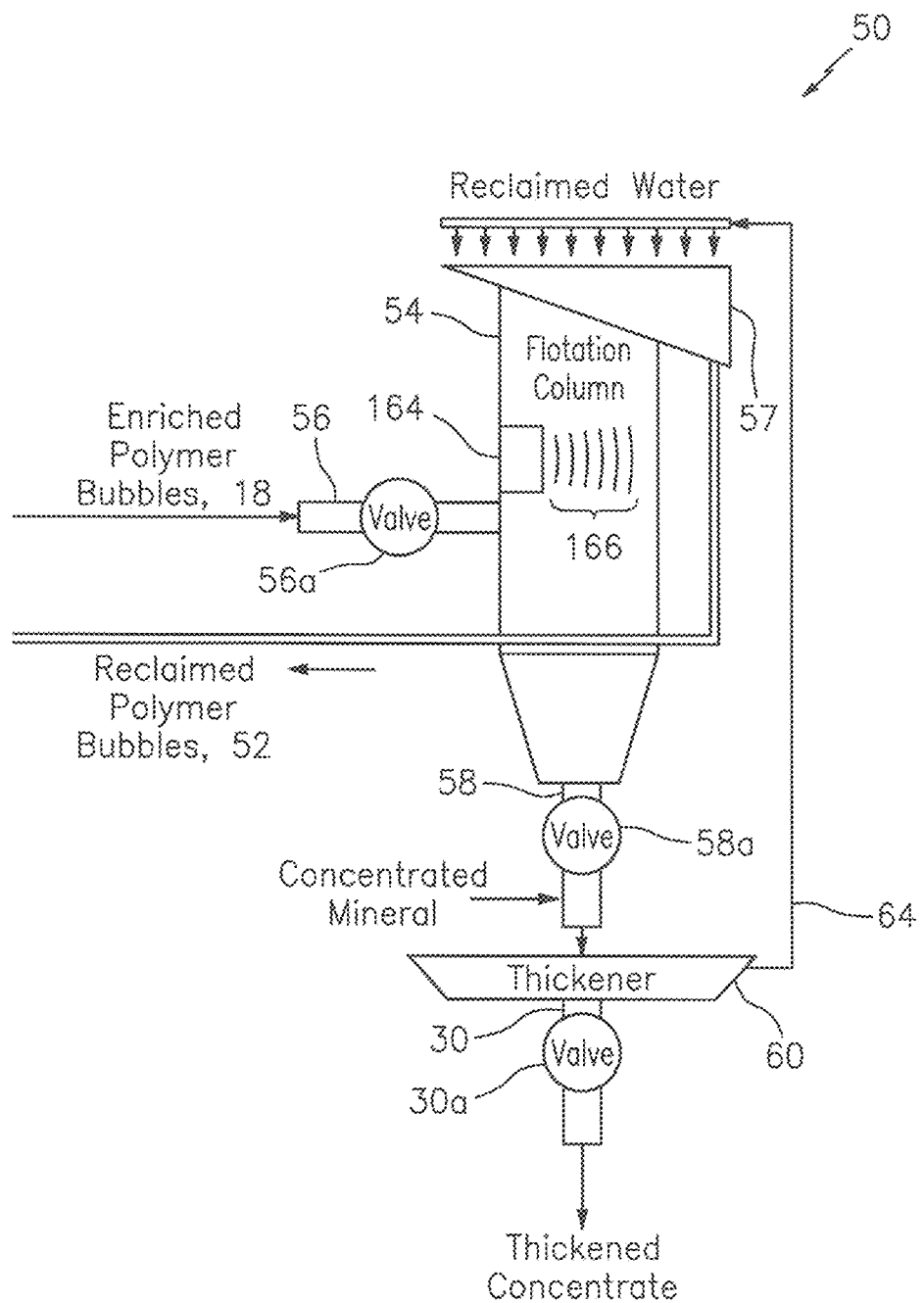
FIG. 7 is a diagram of a bead recovery processor in which the valuable material is sonically removed from the polymer bubbles or beads, according to some embodiments of the present invention.

When ultrasonic waves are applied in a solution or mixture containing the enriched polymer bubbles or beads, at least two possible effects could take place in interrupting the attachment of the valuable material to the surface of the polymer bubbles or beads. The sound waves could cause the attached mineral particles to move rapidly against the surface of the polymer bubbles or beads, thereby shaking the mineral particles loose from the surface. The sound waves could also cause a shape change to the synthetic bubbles, affecting the physical structures on the surface of the synthetic bubbles. It is known that ultrasound is a cyclic sound pressure with a frequency greater than the upper limit of human hearing. Thus, in general, ultrasound goes from just above 20 kilohertz (KHz) all the way up to about 300 KHz. In ultrasonic cleaners, low frequency ultrasonic cleaners have a tendency to remove larger particle sizes more effectively than higher operational frequencies. However, higher operational frequencies tend to produce a more penetrating scrubbing action and to remove particles of a smaller size more effectively. In mineral releasing applications involving mineral particles finer than 100 μm to 1 mm or larger, according to some embodiments of the present invention, the ultrasonic wave frequencies range from 10 Hz to 10 MHz. By way of example, the bead recovery process or processor 50 as shown in FIG. 1 can be adapted for removing the mineral particles in the enriched polymer bubbles 18 by applying ultrasound to the solution in the flotation column 54. For example, as the reclaimed water from piping 64 is used to wash the enriched polymer bubbles 18 inside the flotation column 54, it is possible to use an ultrasonic wave producer 164 to apply the ultrasound 166 in order to release the valuable material (mineral particles 72, FIG. 3b) from the enriched polymer bubbles 18. A diagram illustrating the ultrasonic application is shown in FIG. 7. According to some embodiments of the present application, an ultrasonic frequency that is the resonant frequency of the synthetic beads or bubbles is selected for mineral releasing applications.

Chemically Releasing Valuable Material

Figure 8:
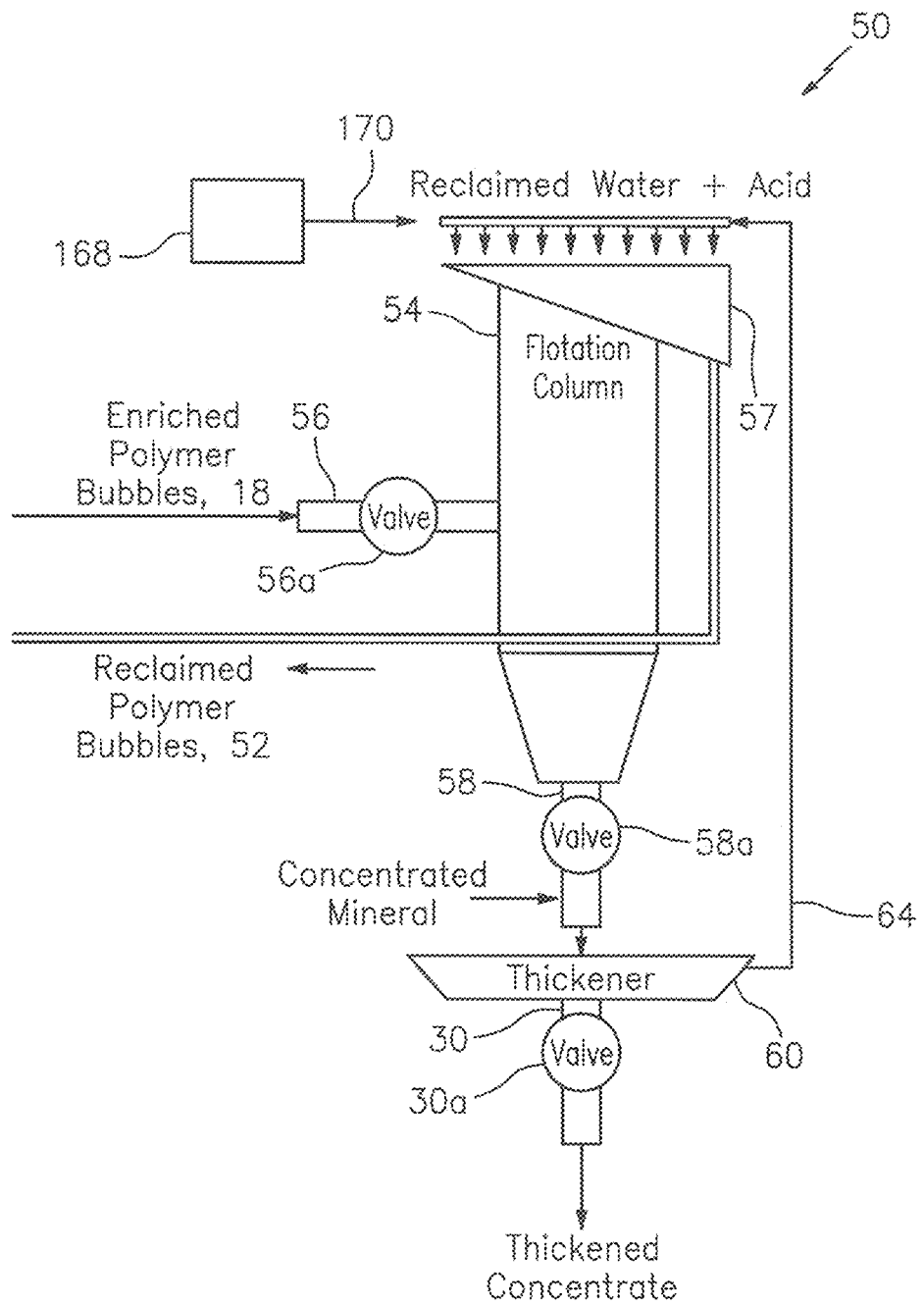
FIG. 8 is a diagram of a bead recovery processor in which the valuable material is chemically removed from the polymer bubbles or beads, according to some embodiments of the present invention.

In physisorption, the valuable minerals are reversibly associated with the synthetic bubbles or beads, attaching due to electrostatic attraction, and/or van der Waals bonding, and/or hydrophobic attraction, and/or adhesive attachment. The physisorbed mineral particles can be desorbed or released from the surface of the synthetic bubbles or beads if the pH value of the solution changes. Furthermore, the surface chemistry of the most minerals is affected by the pH. Some minerals develop a positive surface charge under acidic conditions and a negative charge under alkaline conditions. The effect of pH changes is generally dependent on the collector and the mineral collected. For example, chalcopyrite becomes desorbed at a higher pH value than galena, and galena becomes desorbed at a higher pH value than pyrite. If the valuable mineral is collected at a pH of 8 to 11, it is possible to weaken the bonding between the valuable mineral and the surface of the polymer bubbles or beads by lower the pH to 7 and lower. However, an acidic solution having a pH value of 5 or lower would be more effective in releasing the valuable mineral from the enriched polymer bubbles or beads. According to one embodiment of the present invention, the bead recovery process or processor 50 as shown in FIG. 1 can be adapted for removing the mineral particles in the enriched polymer bubbles 18 by changing the pH of the solution in the flotation column 54. For example, as the reclaimed water from piping 64 is used to wash the enriched polymer bubbles 18 inside the flotation column 54, it is possible to use a container 168 to release an acid or acidic solution 170 into the reclaimed water as shown in FIG. 8. There are a number of acids easily available for changing the pH. For example, sulfuric acid (HCl), hydrochloric acid ($H_2SO_4$), nitric acid ($HNO_3$), perchloric acid ($HClO_4$), hydrobromic acid (HBr) and hydroiodic acid (HI) are among the strong acids that completely dissociate in water. However, sulfuric acid and hydrochloric acid can give the greater pH change at the lowest cost. The pH value used for mineral releasing ranges from 7 to 0. Using a very low pH may cause the polymer beads to degrade. It should be noted that, however, when the valuable material is copper, for example, it is possible to provide a lower pH environment for the attachment of mineral particles and to provide a higher pH environment for the releasing of the mineral particles from the synthetic beads or bubbles.
In general, the pH value is chosen to facilitate the strongest attachment, and a different pH value is chosen to facilitate release. Thus, according to some embodiments of the present invention, one pH value is chosen for mineral attachment, and a different pH value is chosen for mineral releasing. The different pH could be higher or lower, depending on the specific mineral and collector.

The physisorbed mineral particles can be desorbed or released from the surface of the synthetic bubbles or beads if a surface active agent is introduced which interferes with the adhesive bond between the particles and the surface. In one embodiment, when the surface active agent is combined with mechanical energy, the particle easily detaches from the surface.

Electromagnetically Releasing Valuable Material

Figure 9:
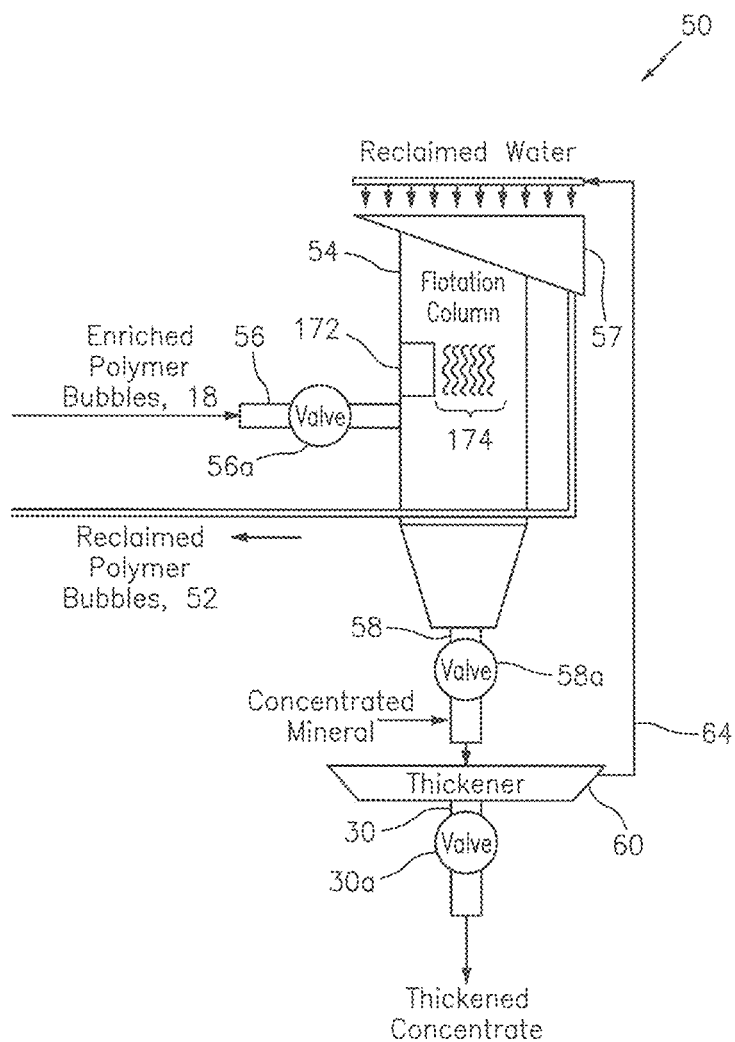
FIG. 9 is a diagram of a bead recovery processor in which the valuable material is electromagnetically removed from the polymer bubbles or beads, according to some embodiments of the present invention.

More than one way can be used to interrupt the bonding between the mineral particles and the synthetic bubbles or beads electromagnetically. For example, it is possible to use microwaves to heat up the enriched synthetic bubbles or beads and the water in the flotation column. It is also possible use a laser beam to weaken the bonds between the functional groups and the polymer surface itself. Thus, it is possible to provide a microwave source or a laser light source where the enriched synthetic bubbles or beads are processed. By way of example, the bead recovery process or processor 50 as shown in FIG. 1 can be adapted for removing the mineral particles in the enriched polymer bubbles 18 by using an electromagnetic source to provide electromagnetic waves to the solution or mixture in the flotation column 54. For example, as the reclaimed water from piping 64 is used to wash the enriched polymer bubbles 18 inside the flotation column 54, it is possible to use a microwave source 172 to apply the microwave beam 174 in order to release the valuable material (mineral particles 72, FIG. 3*b*) from the enriched polymer bubbles 18. A diagram illustrating the ultrasonic application is shown in FIG. 9.

Mechanically Releasing Valuable Material

Figure 10:
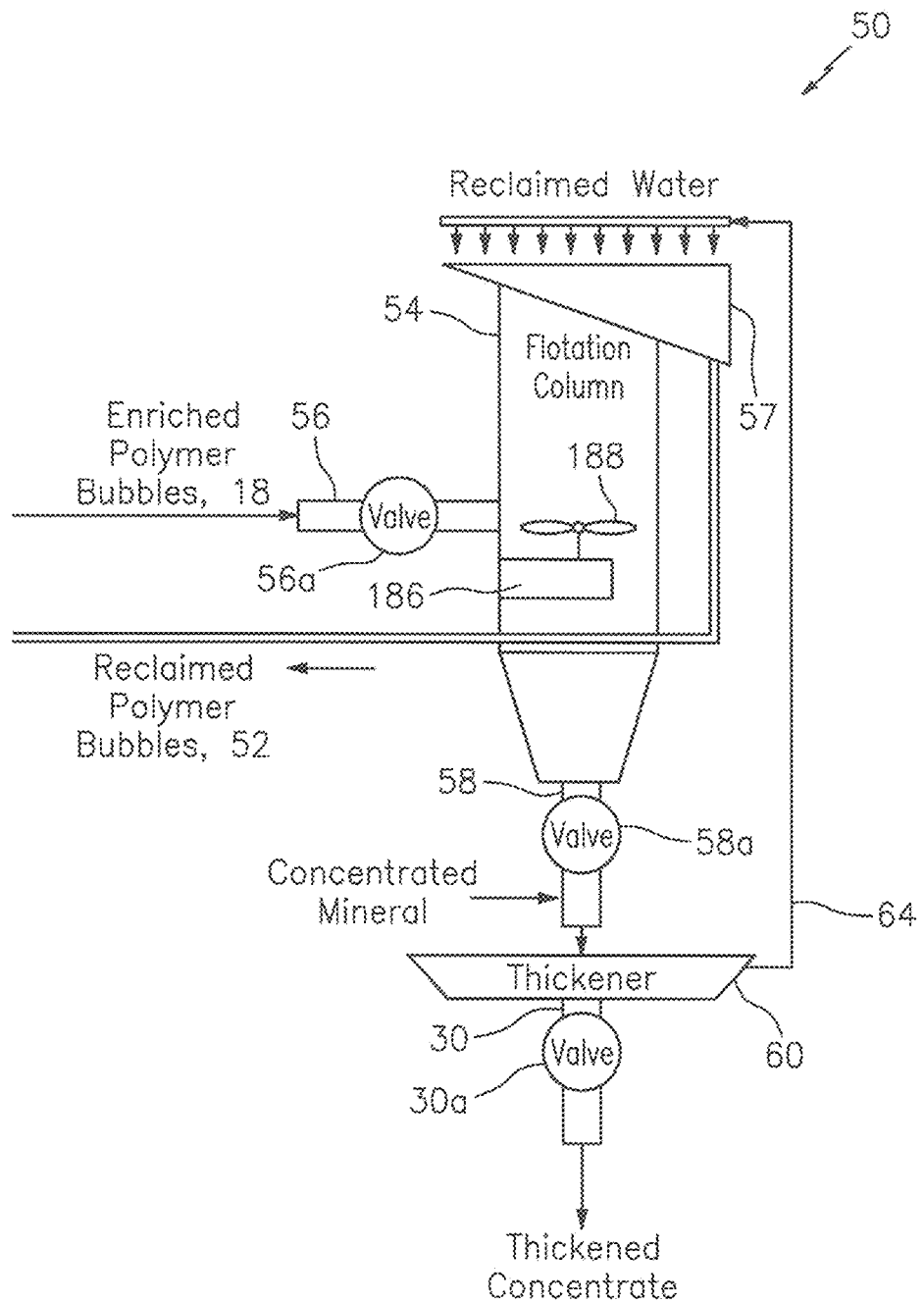
FIG. 10 is a diagram of a bead recovery processor in which the valuable material is mechanically removed from the polymer bubbles or beads, according to some embodiments of the present invention.

When the enriched synthetic bubbles or beads are densely packed such that they are in a close proximity to each other, the rubbing action among adjacent synthetic bubbles or beads may cause the mineral particles attached to the enriched synthetic bubbles or beads to be detached. By way of example, the bead recovery process or processor 50 as shown in FIG. 1 can be adapted for removing the mineral particles in the enriched polymer bubbles 18 mechanically. For example, a motor 186 and a stirrer 188 are used to move the enriched polymer bubbles around, causing the enriched polymer bubbles or beads 18 inside the flotation column 54 to rub against each other. If the synthetic bubbles or beads are magnetic, the stirrer 188 can be a magnetic stirrer. A diagram illustrating a mechanical release of valuable material is shown in FIG. 10.

Other Types or Kinds of Release Techniques

A heater like element 150 (FIG. 6), an ultrasonic wave producer like element 164 (FIG. 7), a container like element 168 (FIG. 8), a microwave source like element 172 (FIG. 9), a motor and stirrer like elements 186 188 (FIG. 10) are known in the art, and the scope of the invention is not intended to be limited to any particular type or kind thereof either now known or later developed in the future.

The scope of the invention is also intended to include other types or kinds of releasing apparatus consistent with the spirit of the present invention either now known or later developed in the future.

Multi-Stage Removal of Valuable Material

Figure 11:
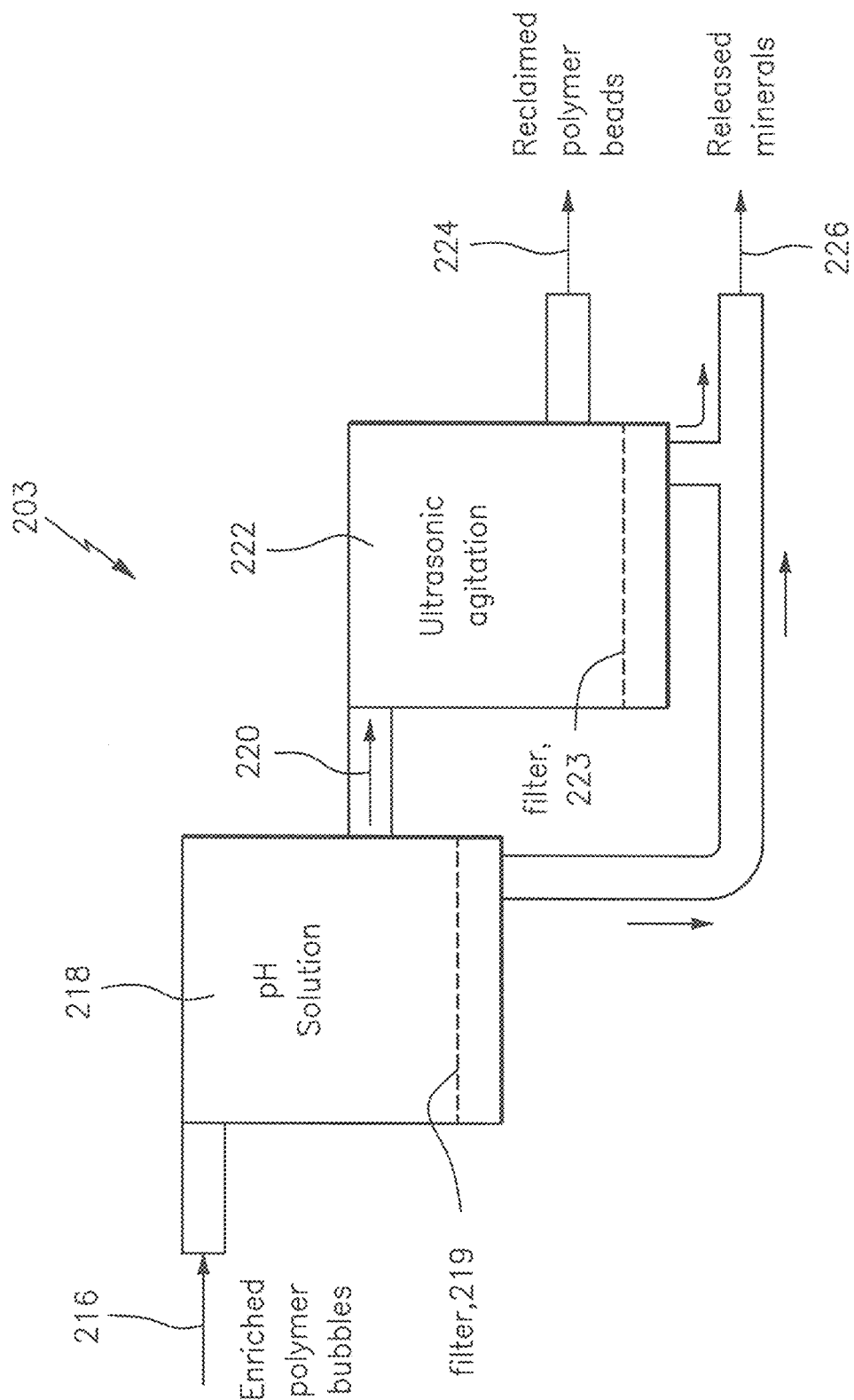
FIG. 11 is a diagram of a bead recovery processor in which the valuable material is removed from the polymer bubbles or beads in two or more stages, according to some embodiments of the present invention.

More than one of the methods for releasing the valuable material from the enriched synthetic bubbles or beads can be used in the same bead recovery process or processor at the same time. For example, while the enriched synthetic bubbles or beads 18 are subjected to ultrasonic agitation (see FIG. 7), the reclaimed water can also be heated by a water heater, such as a heater 150 as depicted in FIG. 6. Furthermore, an acidic solution can be also added to the water to lower the pH in the flotation column 54. In a different embodiment of the present invention, same or different releasing methods are used sequentially in different stages. By way of example, the enriched polymer bubbles 216 from the separation apparatus 200 (see FIG. 2) can be processed in a multi-state processor 203 as shown in FIG. 11. The apparatus 200 has a first recovery processor 218 where an acidic solution is used to release the valuable material at least partially from the enriched polymer bubbles 216. A filter 219 is used to separate the released mineral 226 from the polymer bubbles 220. At a second recovery processor 222, an ultrasound source is used to apply ultrasonic agitation to the polymer bubbles 220 in order to release the remaining valuable material, if any, from the polymer bubbles. A filter 223 is used to separate the released mineral 226 from the reclaimed polymer bubbles 224. It is understood that more than two processing stages can be carried out and different combinations of releasing methods are possible.

FIG. 12: Horizontal Pipeline

According to some embodiments of the present invention, the separation process can be carried out in a horizontal pipeline as shown in FIG. 12. As shown in FIG. 12, the synthetic bubbles or beads 308 may be used in, or form part of, a size-based separation process using countercurrent flows with mixing implemented in apparatus such as a horizontal pipeline generally indicated as 300. In FIG. 12, the horizontal pipeline 310 is configured with a screen 311 to separate the enriched synthetic bubbles or beads 302 having the valuable material attached thereto from the mixture based at least partly on the difference in size. The horizontal pipeline 310 may be configured to separate the enriched synthetic bubbles or beads 302 having the valuable material attached thereto from the mixture using countercurrent flows with mixing, so as to receive in the horizontal pipeline 310 slurry 304 flowing in a first direction A, receive in the horizontal pipeline 300 synthetic bubbles or beads 308 flowing in a second direction B opposite to the first direction A, provide from the horizontal pipeline 308 the enriched synthetic bubbles or beads 302 having the valuable material attached thereto and flowing in the second direction B, and provide from the horizontal pipeline 310 waste or tailings 306 that is separated from the mixture using the screen 311 and flowing in the second direction B. In a horizontal pipeline 310, it is not necessary that the synthetic beads or bubbles 308 be lighter than the slurry 304. The density of the synthetic beads or bubbles 308 can be substantially equal to the density of the slurry 304 so that the synthetic beads or bubbles can be in a suspension state while they are mixed with slurry 304 in the horizontal pipeline 310.

Figure 13B:
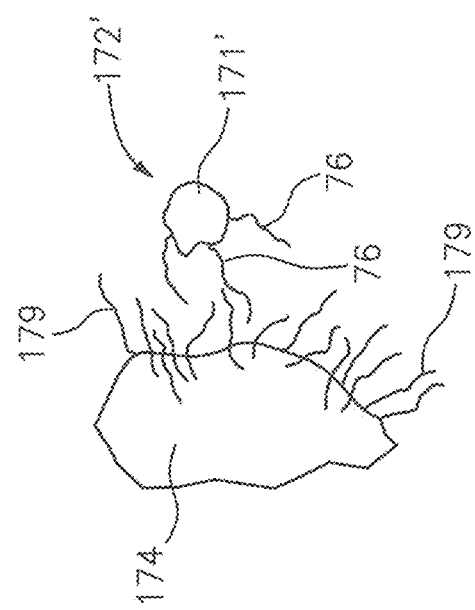
FIG. 13*b* illustrates an enlarged portion of the hydrophobic synthetic bead showing a wetted mineral particle attaching the hydrophobic surface of the synthetic bead.
Figure 13C:
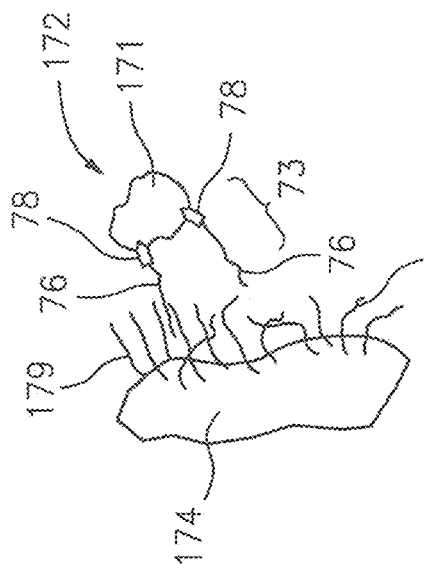
FIG. 13*c* illustrates an enlarged portion of the hydrophobic synthetic bead showing a hydrophobic non-mineral particle attaching the hydrophobic surface of the synthetic bead.
Figure 13A:
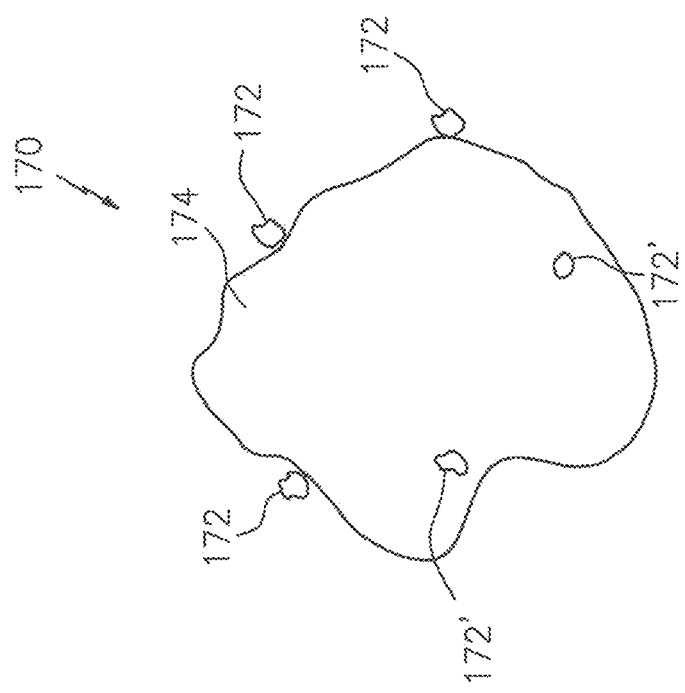
FIG. 13*a* shows a generalized synthetic bead functionalized to be hydrophobic, wherein the bead can be a size-based bead or bubble, weight-based polymer bead and bubble, and magnetic-based bead and bubble, according to some embodiments of the present invention.

It should be understood that the sized-based bead or bubble, weight-based bead or bubble, magnetic-based bead or bubble as described in conjunction with FIGS. 3a-5d can be functionalized to be hydrophobic so as to attract mineral particles. FIG. 13a shows a generalized hydrophobic synthetic bead, FIG. 13b shows an enlarged portion of the bead surface and a mineral particle, and FIG. 13b shows an enlarged portion of the bead surface and a non-mineral particle. As shown in FIG. 13a the hydrophobic synthetic bead 170 has a polymer surface 174 and a plurality of particles 172, 172' attached to the polymer surface 174. FIG. 13b shows an enlarged portion of the polymer surface 174 on which a plurality of molecules 179 rendering the polymer surface 174 hydrophobic.

A mineral particle 171 in the slurry, after combined with one or more collector molecules 73, becomes a wetted mineral particle 172. The collector molecule 73 has a functional group 78 attached to the mineral particle 171 and a hydrophobic end or molecular segment 76. The hydrophobic end or molecular segment 76 is attracted to the hydrophobic molecules 179 on the polymer surface 174. FIG. 13c shows an enlarged portion of the polymer surface 174 with a plurality of hydrophobic molecules 179 for attracting a non-mineral particle 172'. The non-mineral particle 172' has a particle body 171' with one or more hydrophobic molecular segments 76 attached thereto. The hydrophobic end or molecular segment 76 is attracted to the hydrophobic molecules 179 on the polymer surface 174. The term "polymer" in this specification means a large molecule made of many units of the same or similar structure linked together. Furthermore, the polymer associated with FIGS. 13a-13c can be naturally hydrophobic or functionalized to be hydrophobic. Some polymers having a long hydrocarbon chain or silicon-oxygen backbone, for example, tend to be hydrophobic. Hydrophobic polymers include polystyrene, poly(d,l-lactide), poly(dimethylsiloxane), polypropylene, polyacrylic, polyethylene, etc. The bubbles or beads, such as synthetic bead 170 can be made of glass to be coated with hydrophobic silicone polymer including polysiloxanates so that the bubbles or beads become hydrophobic. The bubbles or beads can be made of metal to be coated with silicone alkyd copolymer, for example, so as to render the bubbles or beads hydrophobic. The bubbles or beads can be made of ceramic to be coated with fluoroalkylsilane, for example, so as to render the bubbles and beads hydrophobic. The bubbles or beads can be made of hydrophobic polymers, such as polystyrene and polypropylene to provide a hydrophobic surface. The wetted mineral particles attached to the hydrophobic synthetic bubble or beads can be released thermally, ultrasonically, electromagnetically, mechanically or in a low pH environment.

Figure 14B:
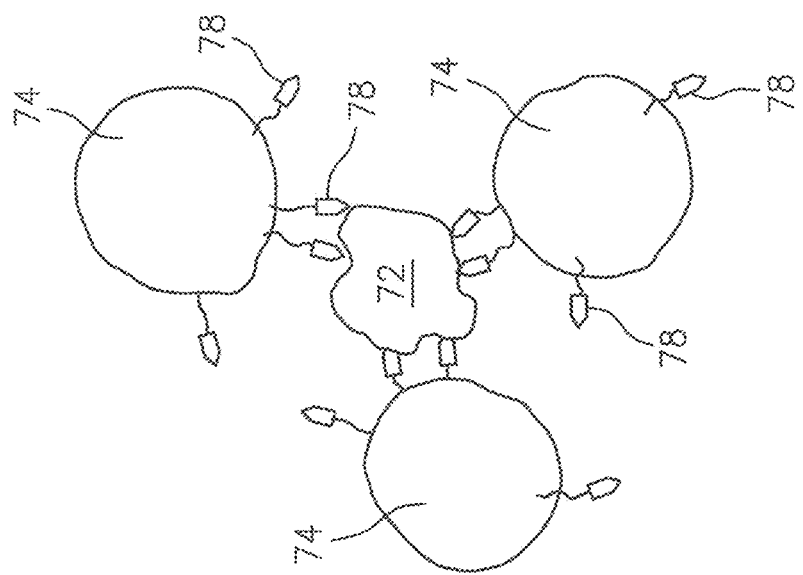
FIG. 14*b* illustrates a mineral particle being attached to a number of slightly larger synthetic beads at the same time.
Figure 14A:
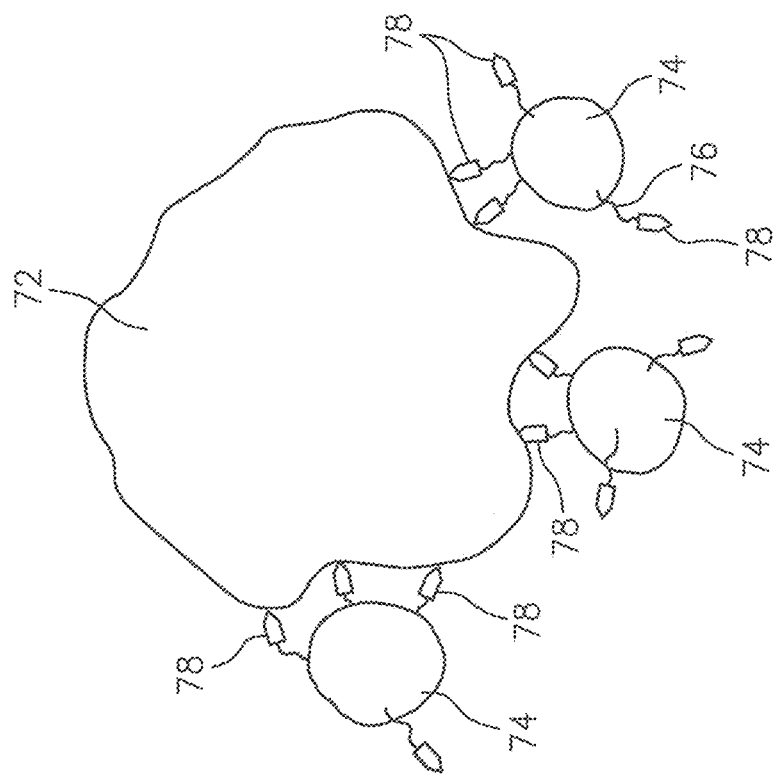
FIG. 14*a* illustrates a mineral particle being attached to a number of much smaller synthetic beads at the same time.

FIG. 14a illustrates a scenario where a mineral particle 72 is attached to a number of synthetic beads 74 at the same time. Thus, although the synthetic beads 74 are much smaller in size than the mineral particle 72, a number of synthetic beads 74 may be able to lift the mineral particle 72 upward in a flotation cell. Likewise, a smaller mineral particle 72 can also be lifted upward by a number of synthetic beads 74 as shown in FIG. 14b. In order to increase the likelihood for this "cooperative" lifting to occur, a large number of synthetic beads 74 can be mixed into the slurry. Unlike air bubbles, the density of the synthetic beads can be chosen such that the synthetic beads may stay along in the slurry before they rise to surface in a flotation cell.

Figure 15B:
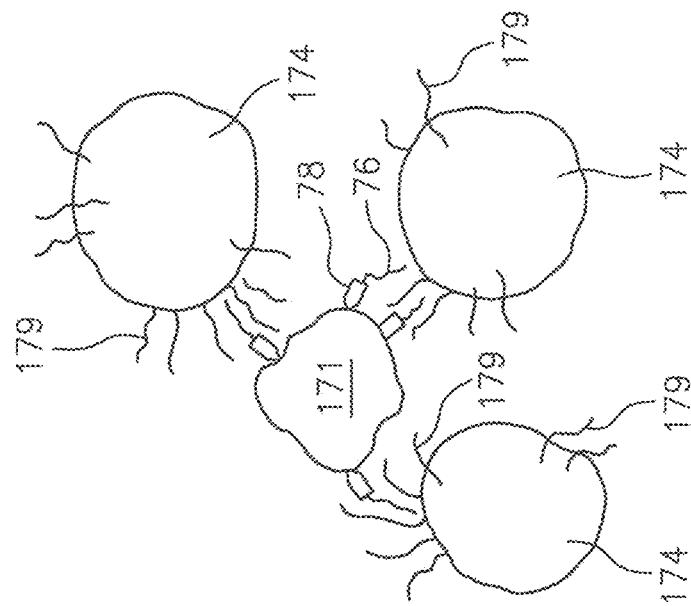
FIG. 15*b* illustrates a wetted mineral particle being attached to a number of slightly larger hydrophobic synthetic beads at the same time.
Figure 15A:
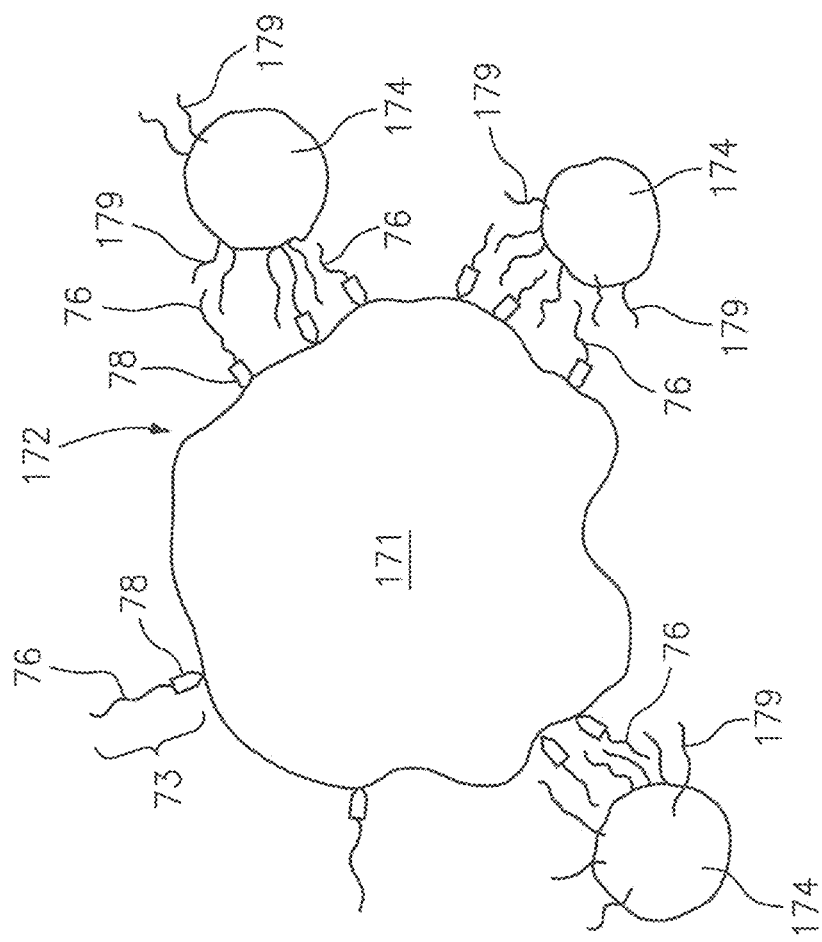
FIG. 15*a* illustrates a wetted mineral particle being attached to a number of much smaller hydrophobic synthetic beads at the same time.

FIGS. 15a and 15b illustrate a similar scenario. As shown, a wetted mineral particle 172 is attached to a number of hydrophobic synthetic beads 174 at the same time.

According to some embodiments of the present invention, only a portion of the surface of the synthetic bead is functionalized to be hydrophobic. This has the benefits as follows:
1. Keeps too many beads from clumping together—or limits the clumping of beads,
2. Once a mineral is attached, the weight of the mineral is likely to force the bead to rotate, allowing the bead to be located under the bead as it rises through the flotation cell;
   a. Better cleaning as it may let the gangue to pass through
   b. Protects the attached mineral particle or particles from being knocked off, and
   c. Provides clearer rise to the top collection zone in the flotation cell.

According to some embodiments of the present invention, only a portion of the surface of the synthetic bead is functionalized with collectors. This also has the benefits of
1. Once a mineral is attached, the weight of the mineral is likely to force the bead to rotate, allowing the bead to be located under the bead as it rises through the flotation cell;
   a. Better cleaning as it may let the gangue to pass through
   b. Protects the attached mineral particle or particles from being knocked off, and
   c. Provides clearer rise to the top collection zone in the flotation cell.

Figure 16A:
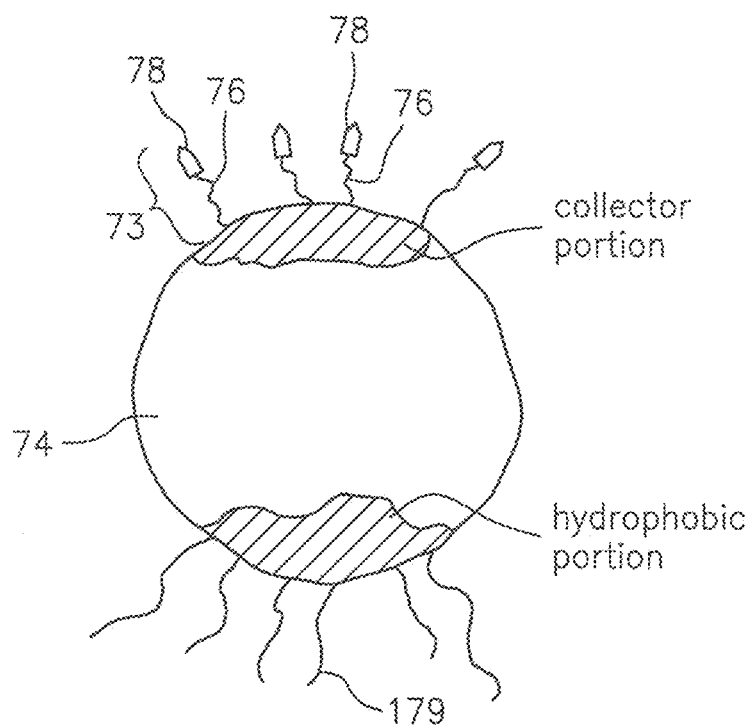
FIGS. 16*a* and 16*b* illustrate some embodiments of the present invention wherein the synthetic bead or bubble have one portion functionalized to have collector molecules and another portion functionalized to be hydrophobic.
Figure 16B:
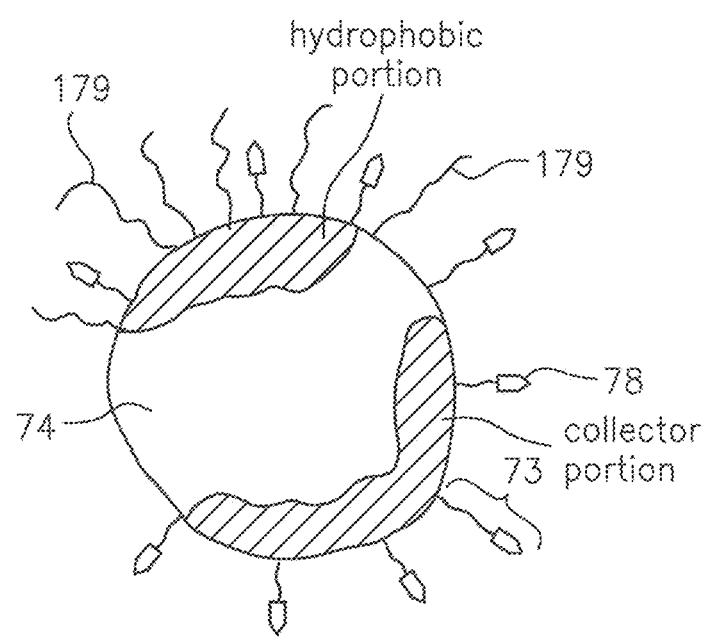

According to some embodiments of the present invention, one part of the synthetic bead is functionalized with collectors while another part of same synthetic bead is functionalized to be hydrophobic as shown in FIGS. 16a and 16b. As shown in FIG. 16a, a synthetic bead 74 has a surface portion where polymer is functionalized to have collector molecules 73 with functional group 78 and molecular segment 76 attached to the surface of the bead 74. The synthetic bead 74 also has a different surface portion where polymer is functionalized to have hydrophobic molecules 179. In the embodiment as shown in FIG. 16b, the entire surface of the synthetic bead 74 can be functionalized to have collector molecules 73, but a portion of the surface is functionalized to have hydrophobic molecules 179 render it hydrophobic. This "hybrid" synthetic bead can collect mineral particles that are wet and not wet.

Applications

The scope of the invention is described in relation to mineral separation, including the separation of copper from ore. It should be understood that the synthetic beads according to the present invention, whether functionalized to have a collector or functionalized to be hydrophobic, are also configured for use in oilsands separation—to separate bitumen from sand and water in the recovery of bitumen in an oilsands mining operation. Likewise, the functionalized filters and membranes, according to some embodiments of the present invention, are also configured for oilsands separation. According to some embodiments of the present invention, the surface of a synthetic bead can be functionalized to have a collector molecule. The collector has a functional group with an ion capable of forming a chemical bond with a mineral particle. A mineral particle associated with one or more collector molecules is referred to as a wetted mineral particle. According to some embodiments of the present invention, the synthetic bead can be functionalized to be hydrophobic in order to collect one or more wetted mineral particles.

The scope of the invention is intended to include other types or kinds of applications either now known or later developed in the future, e.g., including a flotation circuit, leaching, smelting, a gravity circuit, a magnetic circuit, or water pollution control.

FIGS. 17a-17d

As described above in conjunction with FIG. 4d, the synthetic bead 70 can be a porous block or take the form of a sponge or foam with multiple segregated gas filled chamber. According to some embodiments of the present invention, the foam or sponge can take the form of a filter, a membrane or a conveyor belt as described in PCT application no. PCT/US12/39534, entitled "Mineral separation using functionalized membranes;" filed 21 May 2012, which is hereby incorporated by reference in its entirety. Therefore, the synthetic beads described herein are generalized as engineered collection media. Likewise, a porous material, foam or sponge may be generalized as a material with three-dimensional open-cellular structure, an open-cell foam or reticulated foam, which can be made from soft polymers, hard plastics, ceramics, carbon fibers, glass and/or metals, and may include a hydrophobic chemical having molecules to attract and attach mineral particles to the surfaces of the engineered collection media.

Open-cell foam or reticulated foam offers an advantage over non-open cell materials by having higher surface area to volume ratio. Applying a functionalized polymer coating that promotes attachment of mineral to the foam "network" enables higher mineral recovery rates and also improves recovery of less liberated mineral than conventional process. For example, the open cells in an engineered foam block allow passage of fluid and particles smaller than the cell size but captures mineral particles that come in contact with the functionalized polymer coating on the open cells. This also allows the selection of cell size dependent upon slurry properties and application.

Figure 20:
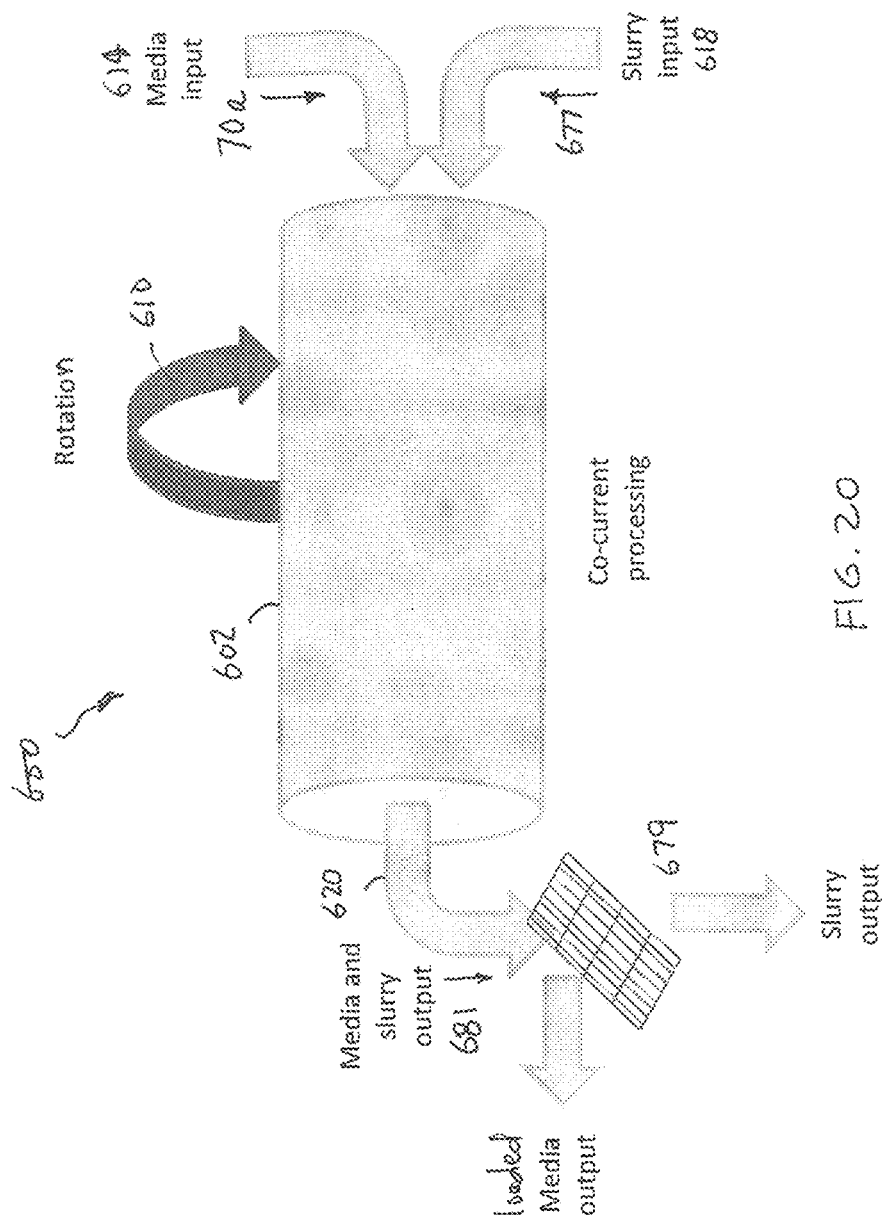
FIG. 20 illustrates a co-current tumbler cell configured to enhance the contact between the collection media and the mineral particles in a slurry, according to some embodiments of the present invention.
Figure 21:
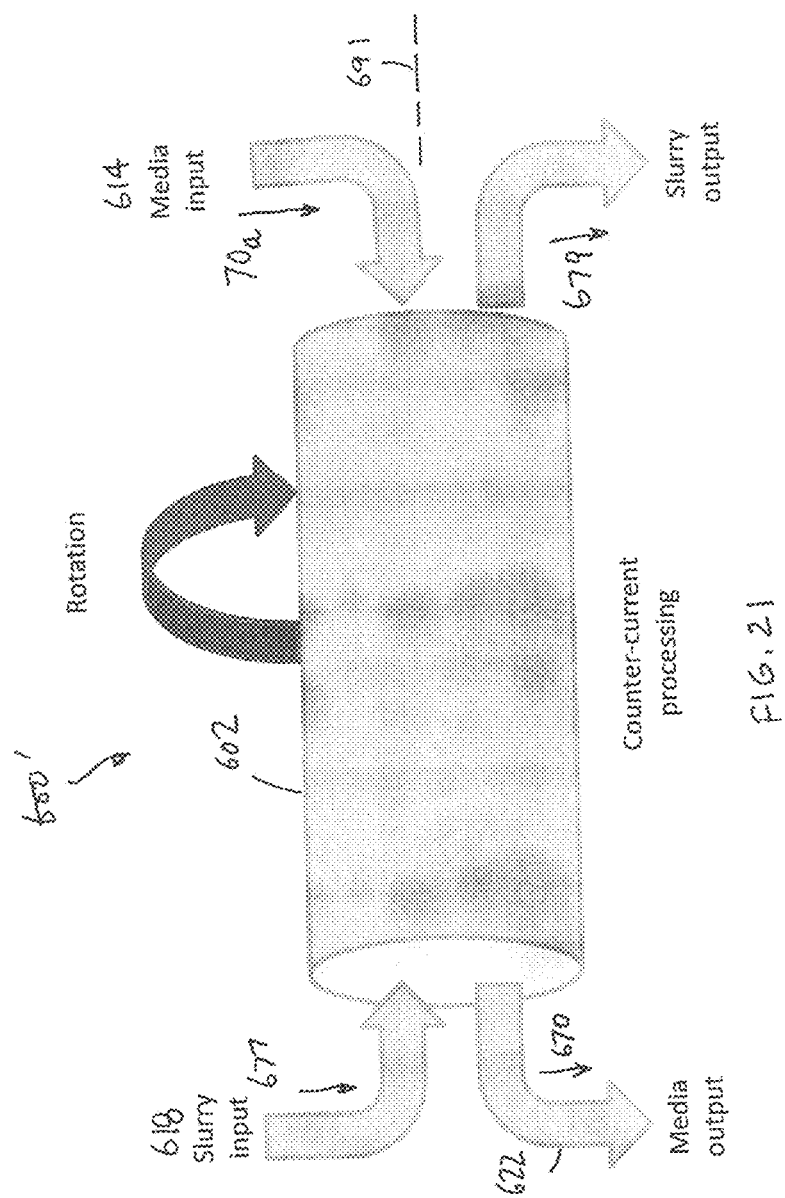
FIG. 21 illustrates a cross-current tumbler cell configured to enhance the contact between the collection media and the mineral particles in a slurry, according to some embodiments of the present invention.

According to some embodiments of the present invention, the engineered collection media take the form of an open-cell foam/structure in a rectangular block or a cubic shape 70a as illustrated in FIG. 17a. Dependent upon the material that is used to make the collection media, the specific gravity of the collection media can be smaller than, equal to or greater than the slurry. Thus, when the collection media are mixed with the slurry for mineral recovery, it is advantageous to use the tumbler cells as shown in FIGS. 20 and 21. These tumbler cells have been disclosed in PCT application serial no. PCT/US16US/68843, entitled "Tumbler cell form mineral recovery using engineered media," filed 28 Dec. 2016, which claims benefit to Provisional Application No. 62/272,026, filed 28 Dec. 2015, which are both incorporated by reference herein in their entirety.

Figure 19:
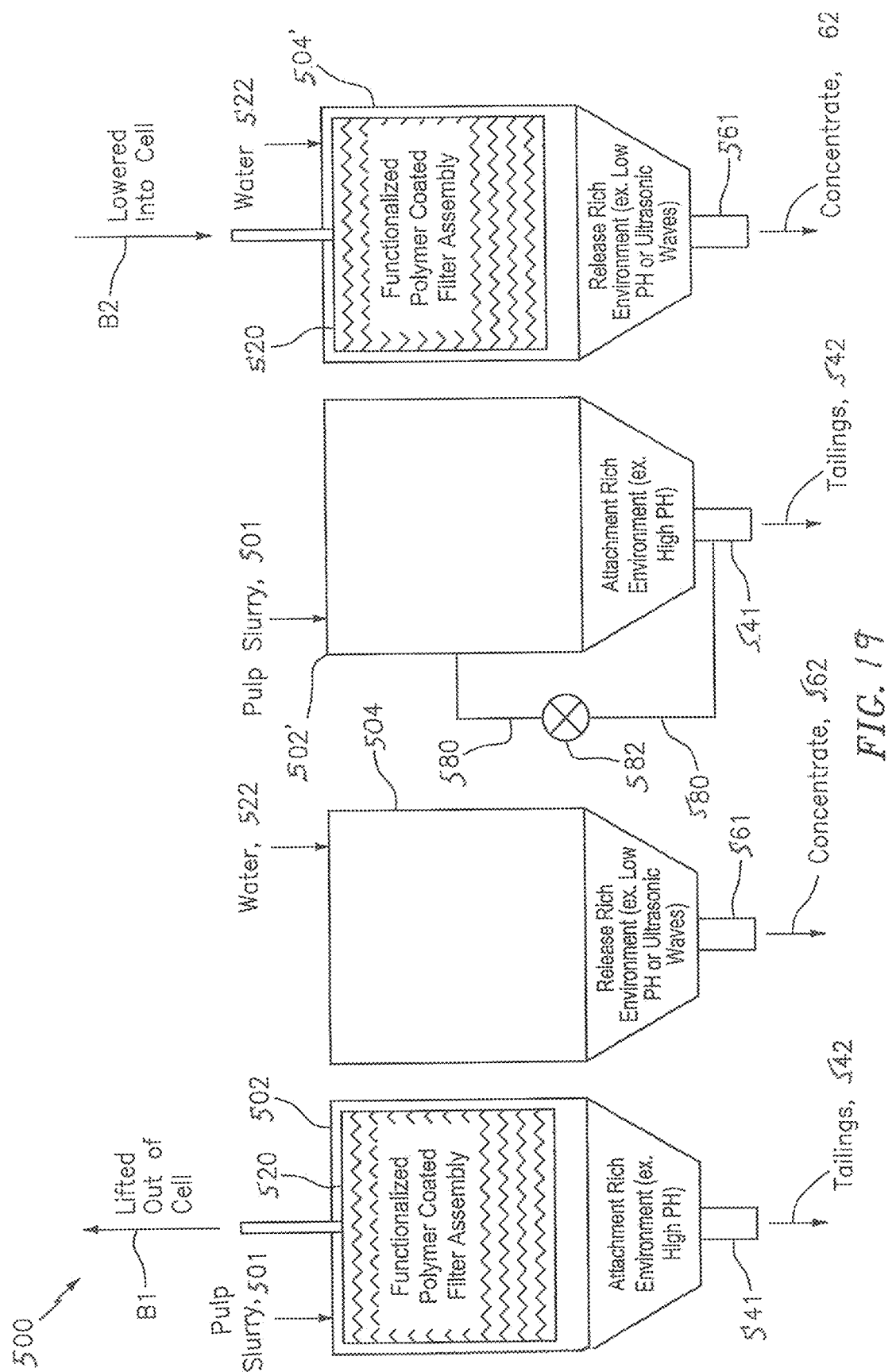
FIG. 19 illustrates a separation processor configured with a functionalized polymer coated filter assembly according to some embodiments of the present invention.

According to some embodiments of the present invention, the engineered collection media may take the form of a filter 70b with a three-dimensional open-cell structure as shown in FIG. 17b. The filter 70b can be used in a filtering assembly as shown in FIG. 19, for example.

Figure 18:
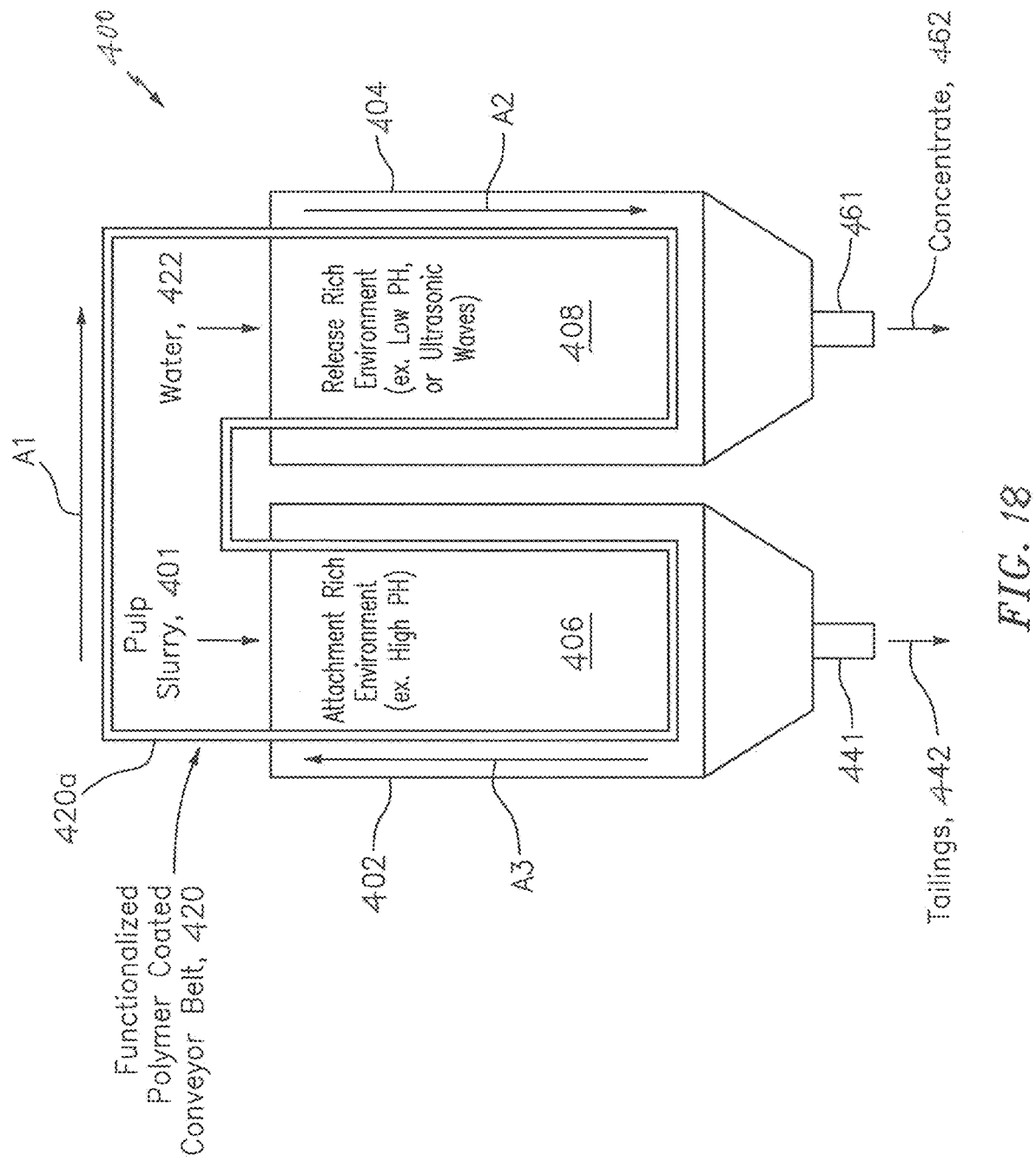
FIG. 18 illustrates a separation processor configured with a functionalized polymer coated conveyor belt arranged therein according to some embodiments of the present invention.

According some embodiments of the present invention, the engineered collection media may take the form of a membrane 70c, a section of which is shown in FIG. 17c. As seen in FIG. 17c, the membrane 70c can have an open-cell foam layer attached to a substrate or base. The substrate can be made from a material which is less porous than the open-cell foam layer. For example, the substrate can be a sheet of pliable polymer to enhance the durability of the membrane. The membrane 70c can be used as a conveyor belt as shown in FIG. 18, for example.

According some embodiments of the present invention, the engineered collection media may take the form of a membrane 70d, a section of which is shown in FIG. 17d. As seen in FIG. 17d, the membrane 70d can have two open-cell foam layers attached to two sides of a substrate or base. The substrate can made of a material which is less porous than the open-cell foam layer. The membrane 70d can also be used as a conveyor belt as shown in FIG. 18, for example.

In various embodiments of the present invention, the engineered collection media as shown in FIGS. 17a-17d may include, or take the form of, a solid-phase body configured with a three-dimensional open-cell structure to provide a plurality of collection surfaces; and a coating may be configured to provide on the collection surfaces a plurality of molecules comprising a functional group having a chemical bond for attracting one or more mineral particles in an aqueous mixture to the molecules, causing the mineral particles to attached to the collection surfaces.

In some embodiments of the present invention, the open-cell structure or foam may include a coating attached thereto to provide a plurality of molecules to attract mineral particles, the coating including a hydrophobic chemical selected from a group consisting of polysiloxanates, poly (dimethylsiloxane) and fluoroalkylsilane, or what are commonly known as pressure sensitive adhesives with low surface energy.

In some embodiments of the present invention, the solid phase body may be made from a material selected from polyurethane, polyester urethane, polyether urethane, reinforced urethanes, PVC coated PV, silicone, polychloroprene, polyisocyanurate, polystyrene, polyolefin, polyvinylchloride, epoxy, latex, fluoropolymer, polypropylene, phenolic, EPDM, and nitrile.

In some embodiments of the present invention, the solid phase body may including a coating or layer, e.g., that may be modified with tackifiers, plasticizers, crosslinking agents, chain transfer agents, chain extenders, adhesion promoters, aryl or alky copolymers, fluorinated copolymers, hexamethyldisilazane, silica or hydrophobic silica.

In some embodiments of the present invention, the solid phase body may include a coating or layer, e.g., made of a material selected from acrylics, butyl rubber, ethylene vinyl acetate, natural rubber, nitriles; styrene block copolymers with ethylene, propylene, and isoprene; polyurethanes, and polyvinyl ethers.

In some embodiments of the present invention, an adhesion agent may be provided between the solid phase body and the coating so as to promote adhesion between the solid phase body and the coating.

In some embodiments of the present invention, the solid phase body may be made of plastic, ceramic, carbon fiber or metal.

In some embodiments of the present invention, the three-dimensional open-cell structure may include pores ranging from 10-200 pores per inch.

In some embodiments of the present inventions, the engineered collection media may be encased in a cage structure that allows a mineral-containing slurry to pass through the cage structure so as to facilitate the contact between the mineral particles in slurry and the engineered collection media.

In some embodiments of the present invention, the cage structures or the filters carrying mineral particles may be removed from the processor so that they can be stripped of the mineral particles, cleaned and reused.

FIG. 18: The Functionalized Polymer Coated Conveyor Belt

By way of example, FIG. 18 shows the present invention is the form of a machine, device, system or apparatus 400, e.g., for separating valuable material from unwanted material in a mixture 401, such as a pulp slurry, using a first processor 402 and a second processor 404. The first processor 402 and the second processor 404 may be configured with a functionalized polymer coated member that is shown, e.g., as a functionalized polymer coated conveyor belt 420 that runs between the first processor 402 and the second processor 404, according to some embodiments of the present invention. The arrows A1, A2, A3 indicate the movement of the functionalized polymer coated conveyor belt 420. Techniques, including motors, gearing, etc., for running a conveyor belt like element 420 between two processors like elements 402 and 404 are known in the art, and the scope of the invention is not intended to be limited to any particular type or kind thereof either now know or later developed in the future. According to some embodiments of the present invention, the functionalized polymer coated conveyor belt 420 may include a layer structure as shown in FIG. 17c or 17d.

The first processor 402 may take the form of a first chamber, tank, cell or column that contains an attachment rich environment generally indicated as 406. The first chamber, tank or column 402 may be configured to receive the mixture or pulp slurry 401 in the form of fluid (e.g., water), the valuable material and the unwanted material in the attachment rich environment 406, e.g., which has a high pH, conducive to attachment of the valuable material. The second processor 404 may take the form of a second chamber, tank, cell or column that contains a release rich environment generally indicated as 408. The second chamber, tank, cell or column 404 may be configured to receive, e.g., water 422 in the release rich environment 408, e.g., which may have a low pH or receive ultrasonic waves conducive to release of the valuable material. Alternatively, a surfactant may be used in the release rich environment 408 to detach the valuable material from the conveyor belt 420 under mechanical agitation or sonic agitation, for example. Sonic agitation can be achieved by a sonic source such as the ultrasonic wave producer 164 as shown in FIG. 7. Mechanical agitation can be achieved by a stirring device such as the stirrer 188 as shown in FIG. 10 or by a brush (not shown) caused to rub against the surface of the conveyor belt 420 while the conveyor belt 420 is moving through the release rich environment.

In operation, the first processor 402 may be configured to receive the mixture or pulp slurry 401 of water, valuable material and unwanted material and the functionalized polymer coated conveyor belt 420 that may be configured to attach to the valuable material in the attachment rich environment 406. In FIG. 18, the belt 420 is understood to be configured and functionalized with a polymer coating to attach to the valuable material in the attachment rich environment 406.

The first processor 402 may also be configured to provide drainage from piping 441 of, e.g., tailings 442 as shown in FIG. 18. The second processor 404 may also be configured to provide the valuable material that is released from the enriched functionalized polymer coated member into the release rich environment 408. For example, in FIG. 18 the second processor 404 is shown configured to provide via piping 461 drainage of the valuable material in the form of a concentrate 462.

FIG. 19: The Functionalized Polymer Coated Filter

By way of example, FIG. 19 shows the present invention is the form of a machine, device, system or apparatus 500, e.g., for separating valuable material from unwanted material in a mixture 501, such as a pulp slurry, using a first processor 502, 502' and a second processor 504, 504'. The first processor 502 and the second processor 504 may be configured to process a functionalized polymer coated member that is shown, e.g., as a functionalized polymer coated collection filter 520 configured to be moved between the first processor 502 and the second processor 504' as shown in FIG. 19 as part of a batch type process, according to some embodiments of the present invention. In FIG. 19, and by way of example, the batch type process is shown as having two first processor 502, 502' and second processor 504, 504, although the scope of the invention is not intended to be limited to the number of first or second processors. According to some embodiments of the present invention, the functionalized polymer coated collection filter 520 may take the form of an engineered collection media having an open-cell structure or made of a foam block as shown in FIG. 17b. The arrow B1 indicates the movement of the functionalized polymer coated filter 520 from the first processor 502, and the arrow B2 indicates the movement of the functionalized polymer coated collection filter 520 into the second processor 502. Techniques, including motors, gearing, etc., for moving a filter like element 520 from one processor to another processor like elements 502 and 504 are known in the art, and the scope of the invention is not intended to be limited to any particular type or kind thereof either now know or later developed in the future.

The first processor 502 may take the form of a first chamber, tank, cell or column that contains an attachment rich environment which has a high pH, conducive to attachment of the valuable material. The second processor 504 may take the form of a second chamber, tank, cell or column that contains a release rich environment which may have a low pH or receive ultrasonic waves conducive to release of the valuable material. Alternatively, the second process 504 may be configured as a stripping tank where a surfactant is used to release the valuable material from the filter 522 under mechanical agitation or sonic agitation, for example.

The first processor 502 may also be configured to provide drainage from piping 541 of, e.g., tailings 542 as shown in FIG. 19. The second processor 504 may be configured to receive the fluid 522 (e.g. water) and the enriched functionalized polymer coated collection filter 520 to release the valuable material in the release rich environment. For example, in FIG. 19 the second processor 504 is shown configured to provide via piping 561 drainage of the valuable material in the form of a concentrate 562.

The first processor 502' may also be configured with piping 580 and pumping 280 to recirculate the tailings 542 back into the first processor 502'. The scope of the invention is also intended to include the second processor 504' being configured with corresponding piping and pumping to recirculate the concentrate 562 back into the second processor 504'.

FIGS. 20 and 21: Tumbler Cells

According to some embodiments of the present invention, the engineered collection media as shown in FIG. 17a can be used for mineral recovery in a co-current device as shown in FIG. 20. FIG. 20 illustrates a co-current tumbler cell configured to enhance the contact between the engineered collection media and the mineral particles in a slurry.

As seen in FIG. 20, the tumbler cell 600 may include a container 602 configured to hold a mixture comprising engineered collection media 70a and a pulp slurry or slurry 677. The slurry 677 may contain mineral particles (see FIGS. 3a and 3b). The container 602 may include a first input 614 configured to receive the engineered collection media 70a and a second input 618 configured to receive the slurry 677. On the other side of the container 602, an output 620 may be provided for discharging at least part of the mixture 681 from the container 602 after the engineered collection media 70a are caused to interact with the mineral particles in slurry 677 in the container. The mixture 681 may contain mineral laden media or loaded media and ore residue or tailings 679. The arrangement of the inputs and output on the container 602 as shown in FIG. 20 is known as a co-current configuration. The engineered collection media 70a may include collection surfaces functionalized with a chemical having molecules to attract the mineral particles to the collection surface so as to form mineral laden media. In general, if the specific gravity of the engineered collection media 70a is smaller than the slurry 677, then a substantial amount of the engineered collection media 70a in the container 602 may stay afloat on top the slurry 677. If the specific gravity of the collection media 70a is greater than the slurry 677, then a substantial amount of the engineered collection media 70a may sink to the bottom of the container 602. As such, the interaction between the engineered collection media 70a and the mineral particles in slurry 677 may not be efficient to form mineral laden media. In order to increase or enhance the contact between the engineered collection media 70a and the mineral particles in slurry 677, the container 602 may be caused to turn, e.g., such that at least some of the mixture in the upper part of the container may be caused to interact with at least some of mixture in the lower part of the container 602. After being discharged from the container 602, the mixture 681 having mineral laden media and ore residue may be processed through a separation device such as a screen so that the mineral laden media and the ore residue can be separated. The container 602 can be a horizontal pipe or cylindrical drum configured to be rotated, as indicated by numeral 610, along a horizontal axis, for example.

FIG. 21 illustrates a cross-current tumbler cell configured to enhance the contact between the collection media and the mineral particles in a slurry, according to some embodiments of the present invention. As seen in FIG. 21, the container 602 of the tumbler cell 600' a first input 614, a second input 618, a first output 622 and a second output 624. The first input 614 may be arranged to receive engineered collection media 70a and the second output 624 is arranged to discharge ore residue 679. The second input 618 may be arranged to receive slurry 677 and the first output 622 is arranged to discharge mineral laden media 670. The arrangement of the inputs and outputs on the container 602 is known as a counter-current configuration. In the counter-current configuration, an internal separation device such as a screen may be used to prevent the medium laden media and the engineered collection media 70a in the container 602 from being discharged through the second output 624. As such, what is discharged through the second output 624 is ore residue or tailings 679. By rotating the container 602 along the rotation axis 691, at least some of the mixture in an upper part of the container 602 may be caused to interact with at least some of the mixture in a lower part of the container 602 so as to increase or enhance the contact between the engineered collection media 70a and the mineral particles in slurry 677.

Three Dimensional Functionalized Open-Network Structure

Surface area is an important property in the mineral recovery process because it defines the amount of mass that can be captured and recovered. High surface area to volume ratios allows higher recovery per unit volume of media added to a cell. As illustrated in FIGS. 17a to 17d, the engineered collection media are shown as having an open-cell structure. Open cell or reticulated foam offers an advantage over other media shapes such as the sphere by having higher surface area to volume ratio. Applying a functionalized polymer coating that promotes attachment of mineral to the foam "network" enables higher recovery rates and improved recovery of less liberated mineral when compared to the conventional process. For example, open cells allow passage of fluid and unattracted particles smaller than the cell size but capture mineral bearing particles that come in contact with the functionalized polymer coating. Selection of cell size is dependent upon slurry properties and application.

The coated foam may be cut in a variety of shapes and forms. For example, a polymer coated foam belt can be moved through the slurry to collect the desired minerals and then cleaned to remove the collected desired minerals. The cleaned foam belt can be reintroduced into the slurry. Strips, blocks, and/or sheets of coated foam of varying size can also be used where they are randomly mixed along with the slurry in a mixing cell. The thickness and cell size of a foam can be dimensioned to be used as a cartridge-like filter which can be removed, cleaned of recovered mineral, and reused.

As mentioned earlier, the open cell or reticulated foam, when coated or soaked with hydrophobic chemical, offers an advantage over other media shapes such as sphere by having higher surface area to volume ratio. Surface area is an important property in the mineral recovery process because it defines the amount of mass that can be captured and recovered. High surface area to volume ratios allows higher recovery per unit volume of media added to a cell.

The open cell or reticulated foam provides functionalized three dimensional open network structures having high surface area with extensive interior surfaces and tortuous paths protected from abrasion and premature release of attached mineral particles. This provides for enhanced collection and increased functional durability. Spherical shaped recovery media, such as beads, and also of belts, and filters, is poor surface area to volume ratio—these media do not provide high surface area for maximum collection of mineral. Furthermore, certain media such as beads, belts and filters may be subject to rapid degradation of functionality.

Applying a functionalized polymer coating that promotes attachment of mineral to the foam "network" enables higher recovery rates and improved recovery of less liberated mineral when compared to the conventional process. This foam is open cell so it allows passage of fluid and unattracted particles smaller than the cell size but captures mineral bearing particles the come in contact with the functionalized polymer coating. Selection of cell size is dependent upon slurry properties and application.

A three-dimensional open cellular structure optimized to provide a compliant, tacky surface of low energy enhances collection of hydrophobic or hydrophobized mineral particles ranging widely in particle size. This structure may include, or take the form of, open-cell foam coated with a compliant, tacky polymer of low surface energy. The foam may include, or take the form of, reticulated polyurethane or another appropriate open-cell foam material such as silicone, polychloroprene, polyisocyanurate, polystyrene, polyolefin, polyvinylchloride, epoxy, latex, fluoropolymer, phenolic, EPDM, nitrile, composite foams and such. The coating may be a polysiloxane derivative such as polydimethylsiloxane and may be modified with tackifiers, plasticizers, crosslinking agents, chain transfer agents, chain extenders, adhesion promoters, aryl or alky copolymers, fluorinated copolymers, hydrophobizing agents such as hexamethyldisilazane, and/or inorganic particles such as silica or hydrophobic silica. Alternatively, the coating may include, or take the form of, materials typically known as pressure sensitive adhesives, e.g. acrylics, butyl rubber, ethylene vinyl acetate, natural rubber, nitriles; styrene block copolymers with ethylene, propylene, and isoprene; polyurethanes, and polyvinyl ethers as long as they are formulated to be compliant and tacky with low surface energy.

The three-dimensional open cellular structure may be coated with a primer or other adhesion agent to promote adhesion of the outer collection coating to the underlying structure.

In addition to soft polymeric foams, other three-dimensional open cellular structures such as hard plastics, ceramics, carbon fiber, and metals may be used. Examples include Incofoam®, Duocel®, metal and ceramic foams produced by American Elements®, and porous hard plastics such as polypropylene honeycombs and such. These structures must be similarly optimized to provide a compliant, tacky surface of low energy by coating as above.

The three-dimensional, open cellular structures above may be coated or may be directly reacted to form a compliant, tacky surface of low energy.

The three-dimensional, open cellular structure may itself form a compliant, tacky surface of low energy by, for example, forming such a structure directly from the coating polymers as described above. This is accomplished through methods of forming open-cell polymeric foams known to the art.

The structure may be in the form of sheets, cubes, spheres, or other shapes as well as densities (described by pores per inch and pore size distribution), and levels of tortuosity that optimize surface access, surface area, mineral attachment/detachment kinetics, and durability. These structures may be additionally optimized to target certain mineral particle size ranges, with denser structures acquiring smaller particle sizes. In general, cellular densities may range from 10-200 pores per inch, more preferably 30-90 pores per inch, and most preferably 30-60 pores per inch.

Figure 22:
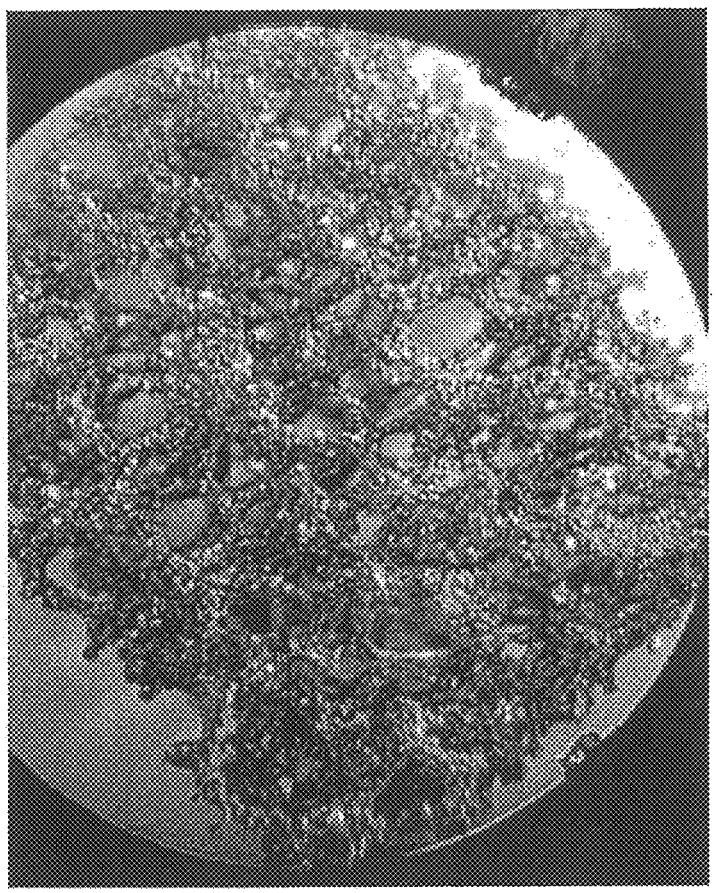
FIG. 22 is a picture showing reticulated foam with Cu Mineral entrained throughout the structure.

The specific shape or form of the structure may be selected for optimum performance for a specific application. For example, the structure (coated foam for example) may be cut in a variety of shapes and forms. For example, a polymer coated foam belt could be moved through the slurry removing the desired mineral whereby it is cleaned and reintroduced into the slurry. Strips, blocks, and/or sheets of coated foam of varying size could also be used where they are randomly mixed along with the slurry in a mixing cell. Alternatively, a conveyor structure may be formed where the foam is encased in a cage structure that allows a mineral-containing slurry to pass through the cage structure to be introduced to the underlying foam structure where the mineral can react with the foam and thereafter be further processed in accordance with the present invention. The thickness and cell size could be changed to a form cartridge like filter whereby the filter is removed, cleaned of recovered mineral, and reused. FIG. 22 is an example a section of polymer coated reticulated foam that was used to recovery Chalcopyrite mineral. Mineral particles captured from copper ore slurry can be seen throughout the foam network.

There are numerous characteristics of the foam that may be important and should also be considered, as follows:

Mechanical durability: Ideally, the foam will be durable in the mineral separation process. For example, a life of over 30,000 cycles in a plant system would be beneficial. As discussed above, there are numerous foam structures that can provide the desired durability, including polyester urethanes, polyether urethanes, reinforced urethanes, more durable shapes (spheres & cylinders), composites like PVC coated PU, and non-urethanes. Other potential mechanically durable foam candidate includes metal, ceramic, and carbon fiber foams and hard, porous plastics.

Chemical durability: The mineral separation process can involve a high pH environment (up to 12.5), aqueous, and abrasive. Urethanes are subject to hydrolytic degradation, especially at pH extremes. While the functionalized polymer coating provides protection for the underlying foam, ideally, the foam carrier system is resistant to the chemical environment in the event that it is exposed.

Adhesion to the coating: If the foam surface energy is too low, adhesion of the functionalized polymer coating to the foam will be very difficult and it could abrade off. However, as discussed above, a low surface energy foam may be primed with a high energy primer prior to application of the functionalized polymer coating to improve adhesion of the coating to the foam carrier. Alternatively, the surface of the foam carrier may be chemically abraded to provide "grip points" on the surface for retention of the polymer coating, or a higher surface energy foam material may be utilized. Also, the functionalized polymer coating may be modified to improve its adherence to a lower surface energy foam. Alternatively, the functionalized polymer coating could be made to covalently bond to the foam.

Surface area: Higher surface area provides more sites for the mineral to bond to the functionalized polymer coating carried by the foam substrate. There is a tradeoff between larger surface area (for example using small pore cell foam) and ability of the coated foam structure to capture mineral while allowing gangue material to pass through and not be capture, for example due to a small cell size that would effectively entrap gangue material. The foam size is selected to optimize capture of the desired mineral and minimize mechanical entrainment of undesired gangue material.

Cell size distribution: Cell diameter needs to be large enough to allow gangue and mineral to be removed but small enough to provide high surface area. There should be an optimal cell diameter distribution for the capture and removal of specific mineral particle sizes.

Tortuosity: Cells that are perfectly straight cylinders have very low tortuosity. Cells that twist and turn throughout the foam have "tortuous paths" and yield foam of high tortuosity. The degree of tortuosity may be selected to optimize the potential interaction of a mineral particle with a coated section of the foam substrate, while not be too tortuous that undesirable gangue material in entrapped by the foam substrate.

Functionalized foam: It may be possible to covalently bond functional chemical groups to the foam surface. This could include covalently bonding the functionalized polymer coating to the foam or bonding small molecules to functional groups on the surface of the foam, thereby making the mineral-adhering functionality more durable.

The pore size (pores per inch (PPI)) of the foam is an important characteristic which can be leveraged to improved mineral recovery and/or target a specific size range of mineral. As the PPI increases the specific surface area (SSA) of the foam also increases. A high SSA presented to the process increases the probability of particle contact which results in a decrease in required residence time. This in turn, can lead to smaller size reactors. At the same time, higher PPI foam acts as a filter due to the smaller pore size and allows only particles smaller than the pores to enter into its core. This enables the ability to target, for example, mineral fines over coarse particles or opens the possibility of blending a combination of different PPI foam to optimize recovery performance across a specific size distribution.

THE RELATED FAMILY

This application is also related to a family of nine PCT applications, which were all concurrently filed on 25 May 2012, as follows:

PCT application no. PCT/US12/39528, entitled "Flotation separation using lightweight synthetic bubbles and beads;"

PCT application no. PCT/US12/39524, entitled "Mineral separation using functionalized polymer membranes;"

PCT application no. PCT/US12/39540, entitled "Mineral separation using sized, weighted and magnetized beads;"

PCT application no. PCT/US12/39576, entitled "Synthetic bubbles/beads functionalized with molecules for attracting or attaching to mineral particles of interest," which corresponds to U.S. Pat. No. 9,352,335;

PCT application serial no. PCT/US12/39591, entitled "Method and system for releasing mineral from synthetic bubbles and beads," filed 25 May 2012, which itself claims the benefit of U.S. Provisional Patent Application No. 61/489,893, filed 25 May 2011, and U.S. Provisional Patent Application No. 61/533,544, filed 12 Sep. 2011, which corresponds to co-pending U.S. patent application Ser. No. 14/117,912, filed 15 Nov. 2013;

PCT application no. PCT/US/39596, entitled "Synthetic bubbles and beads having hydrophobic surface;"

PCT application no. PCT/US/39631, entitled "Mineral separation using functionalized filters and membranes," which corresponds to U.S. Pat. No. 9,302,270;"

PCT application no. PCT/US12/39655, entitled "Mineral recovery in tailings using functionalized polymers;" and PCT application no. PCT/US12/39658, entitled "Techniques for transporting synthetic beads or bubbles In a flotation cell or column," all of which are incorporated by reference in their entirety.

This application also related to PCT application no. PCT/US2013/042202, filed 22 May 2013, entitled "Charged engineered polymer beads/bubbles functionalized with molecules for attracting and attaching to mineral particles of interest for flotation separation," which claims the benefit of U.S. Provisional Patent Application No. 61/650, 210, filed 22 May 2012, which is incorporated by reference herein in its entirety.

This application is also related to PCT/US2014/037823, filed 13 May 2014, entitled "Polymer surfaces having a siloxane functional group," which claims benefit to U.S. Provisional Patent Application No. 61/822,679, filed 13 May 2013, as well as U.S. patent application Ser. No. 14/118,984, filed 27 Jan. 2014, and is a continuation-in-part to PCT application no. PCT/US12/39631 (712-2.385//CCS-0092), filed 25 May 2012, which are all hereby incorporated by reference in their entirety.

This application also related to PCT application no. PCT/US13/28303, filed 28 Feb. 2013, entitled "Method and system for flotation separation in a magnetically controllable and steerable foam," which is also hereby incorporated by reference in its entirety.

This application also related to PCT application no. PCT/US16/57334, filed 17 Oct. 2016, entitled "Opportunities for recovery augmentation process as applied to molybdenum production," which is also hereby incorporated by reference in its entirety.

This application also related to PCT application no. PCT/US16/37322, filed 17 Oct. 2016, entitled "Mineral beneficiation utilizing engineered materials for mineral separation and coarse particle recovery," which is also hereby incorporated by reference in its entirety.

This application also related to PCT application no. PCT/US16/62242, filed 16 Nov. 2016, entitled "Utilizing engineered media for recovery of minerals in tailings stream at the end of a flotation separation process," which is also hereby incorporated by reference in its entirety.

This application is related to PCT application serial no. PCT/US16US/68843, entitled "Tumbler cell form mineral recovery using engineered media," filed 28 Dec. 2016, which claims benefit to Provisional Application No. 62/272,026, entitled "Tumbler Cell Design for Mineral Recovery Using Engineered Media", filed 28 Dec. 2015, which are both incorporated by reference herein in their entirety.

OTHER REFERENCES

Wills, B. A., & Finch, J. A. (2016). *"Wills' mineral processing technology: An introduction to the practical aspects of ore treatment and mineral recovery."*

Laplante, A. R. (2000). "Ten do's & don'ts of gold gravity recovery." http://knelsongravity.xplorex.com/page450.htm. Accessed Oct. 4, 2016.

THE SCOPE OF THE INVENTION

It should be further appreciated that any of the features, characteristics, alternatives or modifications described regarding a particular embodiment herein may also be applied, used, or incorporated with any other embodiment described herein. It should be noted that the engineered collection media having the open-cell structure as shown in FIG. 17a, for example, can be made of a material that has a specific gravity smaller than, equal to or greater than that of the slurry. The engineered collection media can be made from a magnetic polymer or have a magnetic core so that the para-, ferri-, ferro-magnetism of the engineered collection media is greater than the para-, ferri-, ferro-magnetism of the unwanted ground ore particles in the slurry. Thus, although the invention has been described and illustrated with respect to exemplary embodiments thereof, the foregoing and various other additions and omissions may be made therein and thereto without departing from the spirit and scope of the present invention.

What is claimed is:

1. A system for processing a circulating load in a comminution circuit of a mineral separation process for separating mineral particles of interest from an ore, comprising:
    a coarse screen configured to receive a cyclone underflow having mineral particles of interest and forming part of the circulating load of the comminution circuit, and provide undersize coarse screen feeds and oversize coarse screen feeds for further processing;
    an enhanced mineral separation circuit having a collection processor configured to receive one of the undersize coarse screen feeds, and at least one collection apparatus located in the collection processor, the at least one collection apparatus having a collection surface configured with a functionalized polymer comprising a plurality of molecules having a functional group configured to attract the mineral particles of interest to the collection surface, and provide enhanced mineral separation circuit feeds for further processing in the system; and
    a ball mill configured to receive the oversize coarse screen feeds for further processing.

2. A system according to claim 1, wherein the collection processor is configured to receive one of the undersize coarse screen feeds, and provide tails as one of the enhanced mineral separation circuit feeds for further processing.

3. A system according to claim 2, wherein the ball mill is also configured to receive the tails for further processing.

4. A system according to claim 2, wherein the system comprises a cyclone configured to receive the tails for further processing.

5. A system according to claim 4, wherein the cyclone is configured to provide the cyclone underflow back to the coarse screen for further processing and a cyclone overflow for further processing, including as part of a flotation/leaching process.

6. A system according to claim 1, wherein the collection processor is configured to provide concentrate as another one of the enhanced mineral separation circuit feeds for further processing.

7. A system according to claim 6, wherein the system comprises a shaking table configured to receive the concentrate and provide shaking table tails and shaking table concentrate for further processing.

8. A system according to claim 3, wherein
    the ball mill is configured to receive one of the oversize coarse screen feeds for further processing with the tails, and provide a ball mill feed.

9. A system according to claim 8, wherein
    the system comprises a cyclone configured to provide the cyclone underflow; and
    the system comprises a pump to cyclone configured to receive the ball mill feed and a SAG mill feed, and provide a pump-to-cyclone feed to the cyclone.

10. A system according to claim 4, wherein the ball mill is configured to receive the oversize coarse screen feed, and provide a ball mill feed.

11. A system according to claim 10, wherein
    the cyclone is configured to provide the cyclone underflow; and
    the system comprises a pump to cyclone configured to receive the ball mill feed and a SAG mill feed, and provide a pump-to-cyclone feed to the cyclone.

12. A system according to claim 1, wherein the enhanced mineral separation circuit comprises a stripping circuit configured to receive an oversize coarse screen feed as another one of the coarse screen feeds, and provide recycled media that is stripped of the mineral particles of interest as one of the enhanced mineral separation circuit feeds.

13. A system according to claim 12, wherein the recycled media includes the collection surface configured with the functionalized polymer comprising the plurality of molecules having the functional group configured to attract the mineral particles of interest to the collection surface.

14. A system according to claim 12, wherein the enhanced mineral separation circuit comprises an in-line reactor configured to receive the recycled media.

15. A system according to claim 14, wherein the
    ball mill configured to receive the oversize coarse screen feed, and provide a ball mill feed;
    the cyclone is configured to provide the cyclone underflow;
    the system comprises a pump to cyclone configured to receive the ball mill feed and a SAG mill feed, and provide a pump-to-cyclone feed; and
    the in-line reactor configured to receive the pump-to-cyclone feed for further processing with the recycled media.

16. A system according to claim 1, wherein the functional group comprises an ionizing bond for bonding the mineral particles of interest to the molecules.

17. A system according to claim 16, wherein the synthetic material is selected from a group consisting of polyamides, polyesters, polyurethanes, phenol-formaldehyde, urea-formaldehyde, melamine-formaldehyde, polyacetal, polyethylene, polyisobutylene, polyacrylonitrile, poly(vinyl chloride), polystyrene, poly(methyl methacrylates), poly(vinyl acetate), poly(vinylidene chloride), polyisoprene, polybutadiene, polyacrylates, poly(carbonate), phenolic resin, and polydimethylsiloxane.

18. A system according to claim 1, wherein the functional group is configured to render the collection area hydrophobic.

19. A system according to claim 18, wherein the synthetic material is selected from a group consisting of polystyrene, poly(d,l-lactide), poly(dimethylsiloxane), polypropylene, polyacrylic, polyethylene, hydrophobically-modified ethyl hydroxyethyl cellulose polysiloxanates, alkylsilane and fluoroalkylsilane.

20. A system according to claim 18, wherein the mineral particles of interest have one or more hydrophobic molecular segments attached thereon, and the tailings have a plurality of molecules, each collector molecule comprising a first end and a second end, the first end comprising the functional group configured to attach to the mineral particles of interest, the second end comprising a hydrophobic molecular segment.

21. A system according to claim 18, wherein the synthetic material comprise a siloxane derivative.

22. A system according to claim 18, wherein the synthetic material comprise polysiloxanates or hydroxyl-terminated polydimethylsiloxanes.

23. A system according to claim 1, wherein the collection surface is configured to contact the tailings over a period of time for providing an enriched collection surface in the collection apparatus, containing the mineral particles of interest, said system further comprising:
   a release processor configured to receive the collection apparatus having the enriched collection surface, the release processor further configured to provide a release medium for releasing the mineral particles of interest from the enriched collection surface.

24. A system according to claim 23, wherein said release medium comprises a liquid configured to contact with the enriched collection surface, the liquid having a pH value ranging from 0 to 7.

25. A system according to claim 23, wherein said release medium comprises a liquid configured to contact with the enriched collection surface, said system further comprising:
   an ultrasound source configured to apply ultrasound waves to the enriched collection area for releasing the mineral particles of interest from the enriched collection surface.

26. A system according to claim 1, where a part of the collection surface is configured to have the molecules attached thereto, wherein the molecules comprise collectors.

27. A system according to claim 26, where another part of the collection surface is configured to be hydrophobic.

28. A system according to claim 1, where a part of the collection surface is configured to be hydrophobic.

29. A system according to claim 1, wherein the at least one collection apparatus comprises reticulated foam or a reticulated foam block providing the three-dimensional open-cell structure.

30. A system according to claim 29, wherein the three-dimensional open-cell structure comprises an open cell foam.

31. A system according to claim 30, wherein the open cell foam is made from a material or materials selected from a group that includes polyester urethanes, polyether urethanes, reinforced urethanes, composites like PVC coated PU, non-urethanes, as well as metal, ceramic, and carbon fiber foams and hard, porous plastics, in order to enhance mechanical durability.

32. A system according to claim 30, wherein the open cell foam is coated with polyvinylchloride, and then coated with a compliant, tacky polymer of low surface energy in order to enhance chemical durability.

33. A system according to claim 32, wherein the open cell foam is primed with a high energy primer prior to application of a functionalized polymer coating to increase the adhesion of the functionalized polymer coating to the surface of the open cell foam.

34. A system according to claim 32, wherein the surface of the open cell foam is chemically or mechanically abraded to provide "grip points" on the surface for retention of the functionalized polymer coating.

35. A system according to claim 32, wherein the surface of the open cell foam is coated with a functionalized polymer coating that covalently bonds to the surface to enhance the adhesion between the functionalized polymer coating and the surface.

36. A system according to claim 32, wherein the surface of the open cell foam is coated with a functionalized polymer coating in the form of a compliant, tacky polymer of low surface energy and a thickness selected for capturing certain mineral particles and collecting certain particle sizes, including where thin coatings are selected for collecting proportionally smaller particle size fractions and thick coatings are selected for collecting additional large particle size fractions.

37. A system according to claim 29, wherein the specific surface area is configured with a specific number of pores per inch that is determined to target a specific size range of mineral particles in the slurry.

38. A system according to claim 29, wherein the at least one collection apparatus comprises different open cell foams having different specific surface areas that are blended to recover a specific size distribution of mineral particles in the slurry.

* * * * *